United States Patent
Chiyo et al.

(10) Patent No.: US 9,984,817 B2
(45) Date of Patent: May 29, 2018

(54) COIL FOR WIRELESS POWER TRANSMISSION AND WIRELESS POWER TRANSMISSION APPARATUS

(71) Applicant: TDK CORPORATION, Tokyo (JP)

(72) Inventors: Noritaka Chiyo, Tokyo (JP); Yasuhiro Terasaki, Tokyo (JP)

(73) Assignee: TDK CORPORATION, Tokyo (JP)

( * ) Notice: Subject to any disclaimer, the term of this patent is extended or adjusted under 35 U.S.C. 154(b) by 410 days.

(21) Appl. No.: 14/668,297

(22) Filed: Mar. 25, 2015

(65) Prior Publication Data

US 2015/0279557 A1  Oct. 1, 2015

(30) Foreign Application Priority Data

Mar. 31, 2014 (JP) .................. 2014-072243
Jan. 23, 2015 (JP) .................. 2015-010868

(51) Int. Cl.
*H01F 27/42* (2006.01)
*H01F 37/00* (2006.01)
*H01F 38/00* (2006.01)
*H01F 38/14* (2006.01)
*H02J 5/00* (2016.01)
*B60L 11/18* (2006.01)
*H01F 3/10* (2006.01)
*H01F 27/38* (2006.01)
*H02J 50/10* (2016.01)
*H02J 50/40* (2016.01)
*H02J 50/90* (2016.01)

(52) U.S. Cl.
CPC ............ *H01F 38/14* (2013.01); *B60L 11/182* (2013.01); *B60L 11/1824* (2013.01); *B60L 11/1829* (2013.01); *B60L 11/1833* (2013.01); *H01F 3/10* (2013.01); *H01F 27/38* (2013.01); *H02J 5/005* (2013.01); *H02J 50/10* (2016.02); *H02J 50/40* (2016.02); *H02J 50/90* (2016.02); *Y02T 10/7005* (2013.01); *Y02T 10/7072* (2013.01); *Y02T 90/12* (2013.01); *Y02T 90/121* (2013.01); *Y02T 90/122* (2013.01); *Y02T 90/125* (2013.01); *Y02T 90/14* (2013.01)

(58) Field of Classification Search
CPC ........................................ H01F 38/14
USPC ........................................ 307/104
See application file for complete search history.

(56) References Cited

U.S. PATENT DOCUMENTS

| | | | |
|---|---|---|---|
| 7,795,763 B2 * | 9/2010 | Harris | H02K 35/02 290/1 R |
| 9,318,258 B2 * | 4/2016 | Yamakawa | H01F 38/14 |
| 2014/0247007 A1 * | 9/2014 | Liao | H01F 38/14 320/108 |

FOREIGN PATENT DOCUMENTS

| | | |
|---|---|---|
| JP | H09-65502 A | 3/1997 |
| JP | 2004-229406 A | 8/2004 |
| JP | 2009-164293 A | 7/2009 |

* cited by examiner

*Primary Examiner* — Lincoln Donovan
*Assistant Examiner* — Metasebia Retebo
(74) *Attorney, Agent, or Firm* — Oliff PLC

(57) ABSTRACT

A coil for wireless power transmission in which a plurality of magnetic connection members are disposed in a manner which magnetically connects coils among a plurality of coils, which are adjacent with one or more coils therebetween, and does not magnetically connect coils among the plurality of coils, which are next to each other, and in adjacent coils among the plurality of coils, which are magnetically connected, directions of magnetic fields that are generated when a current flows through the coils are mutually inverse directions.

8 Claims, 14 Drawing Sheets

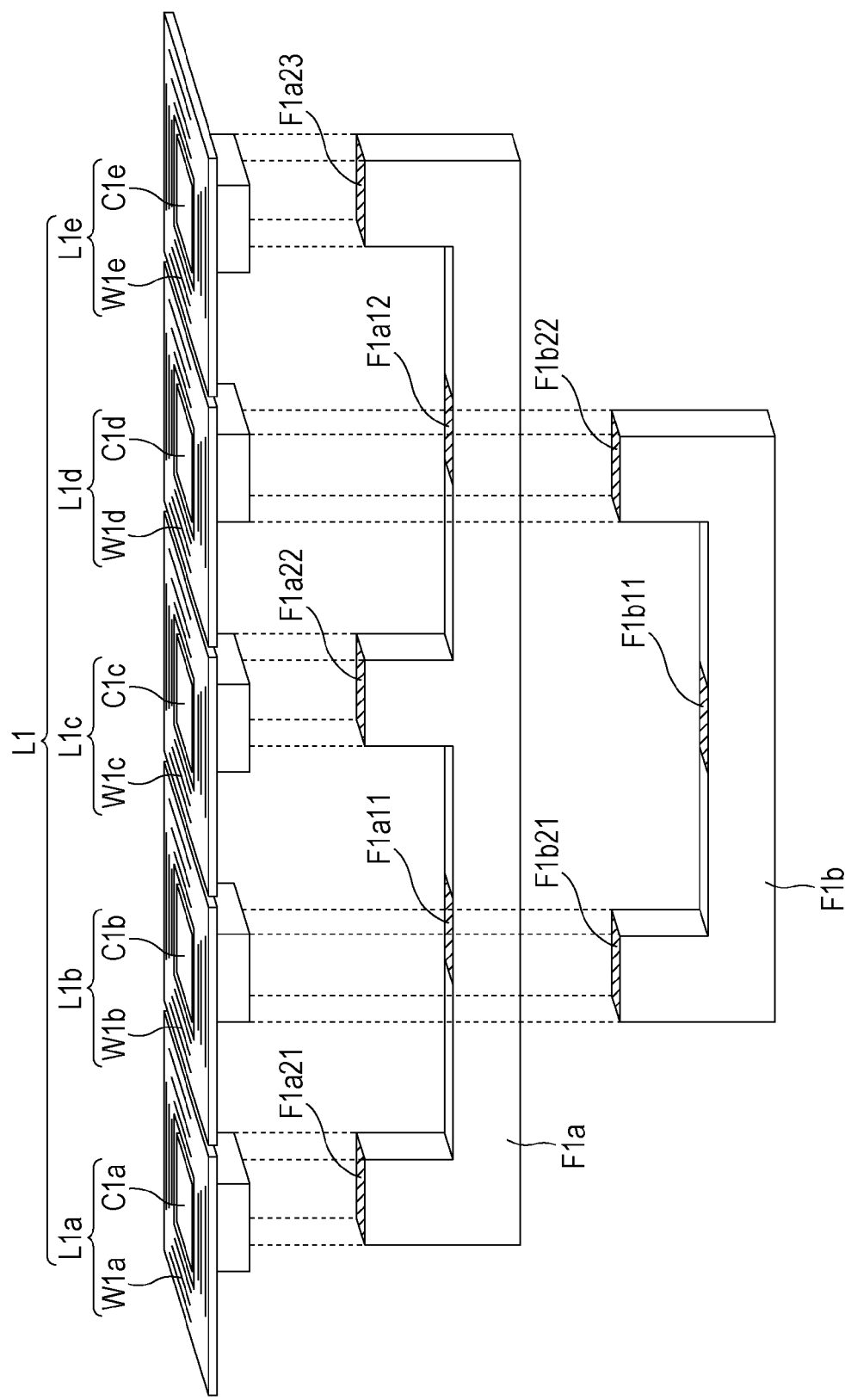

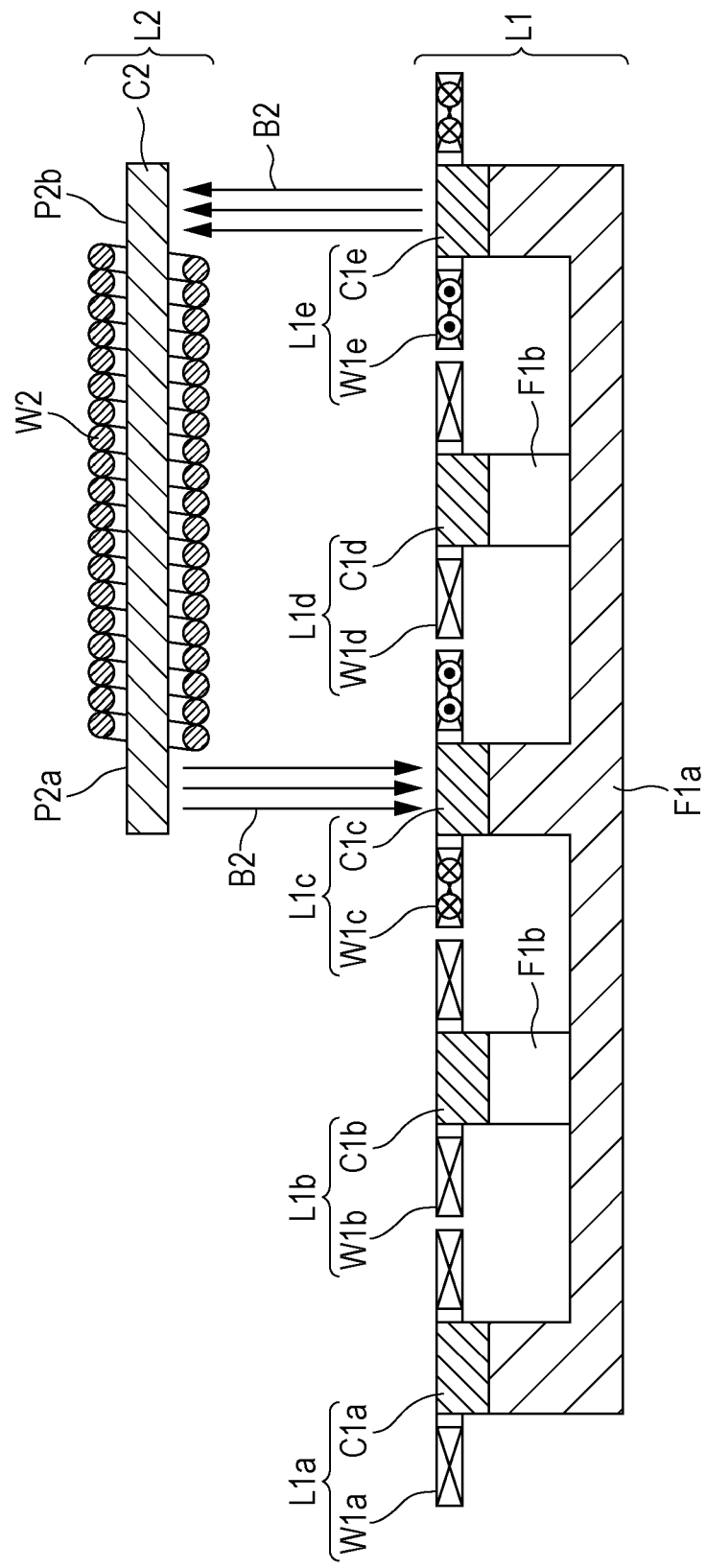

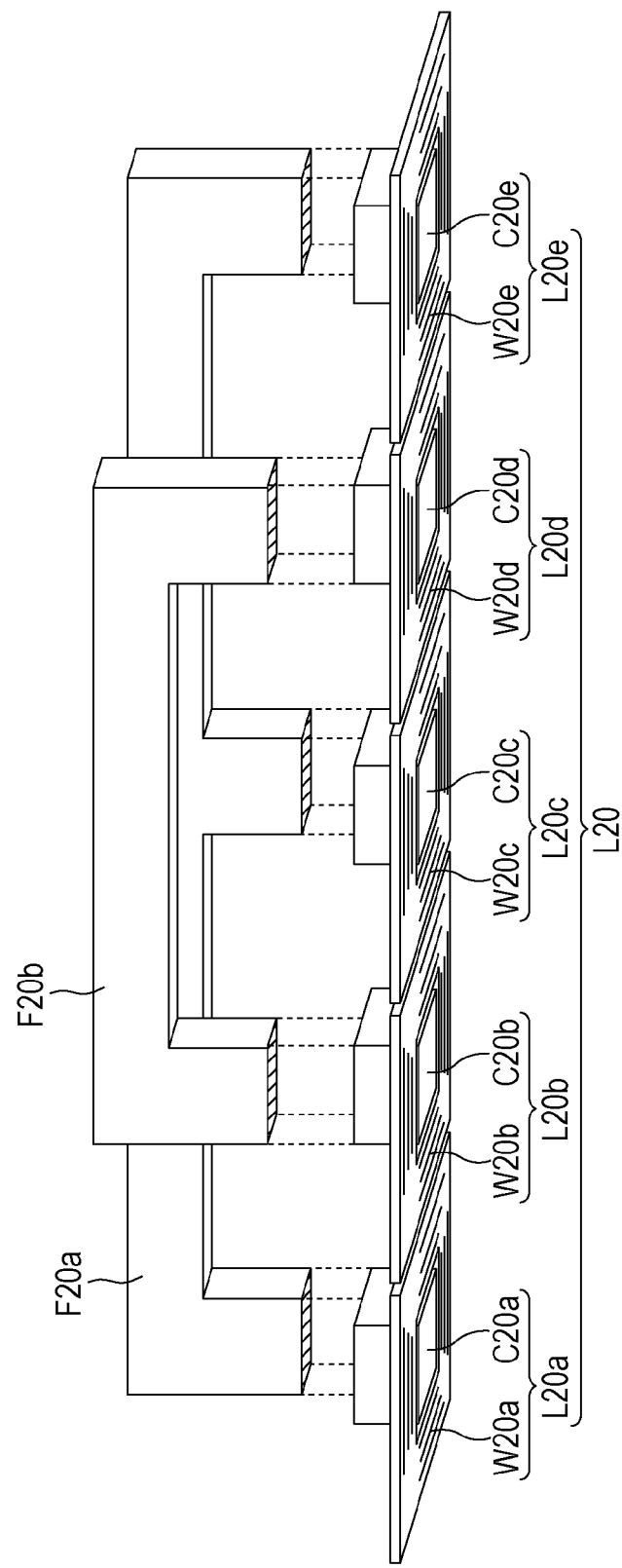

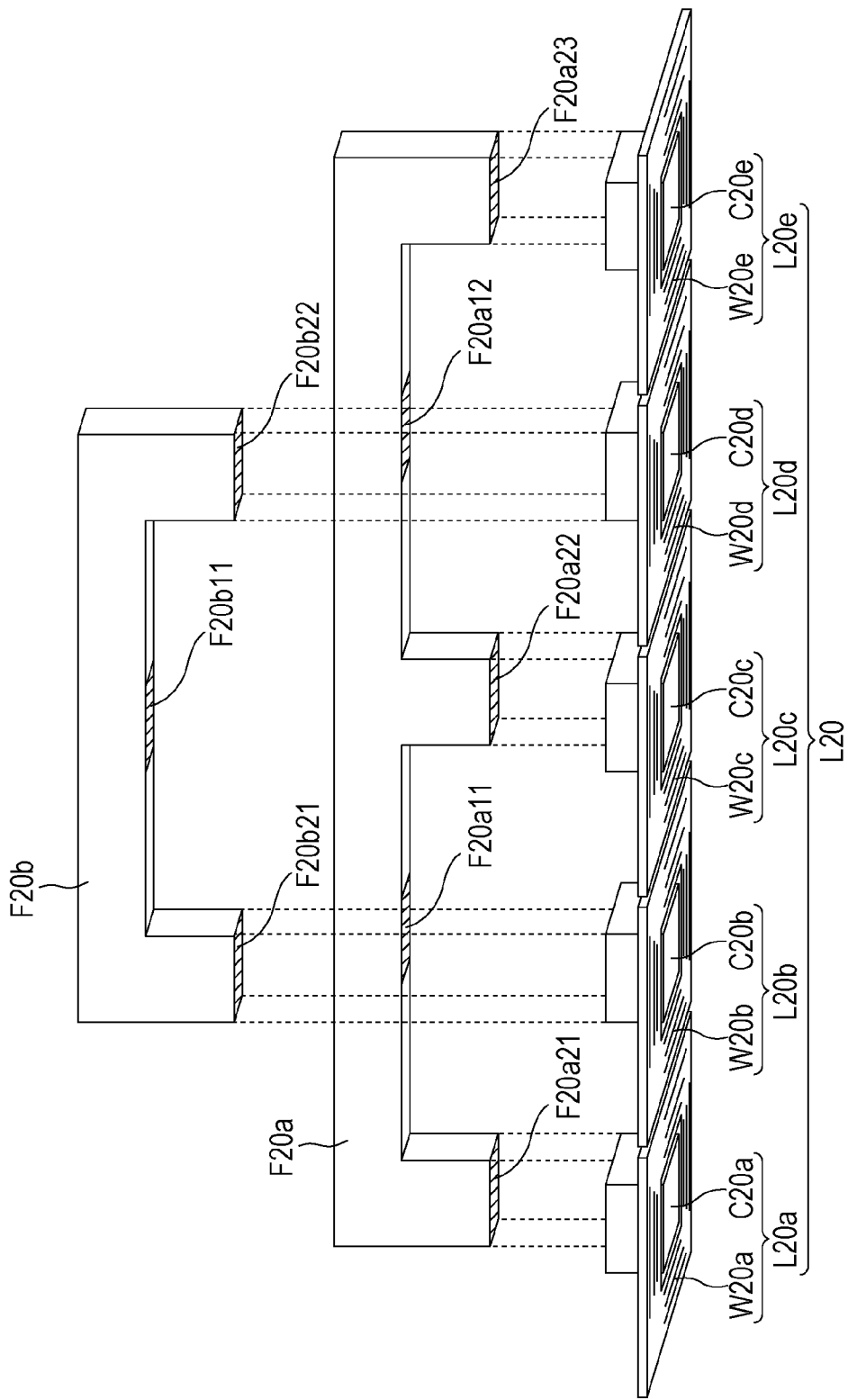

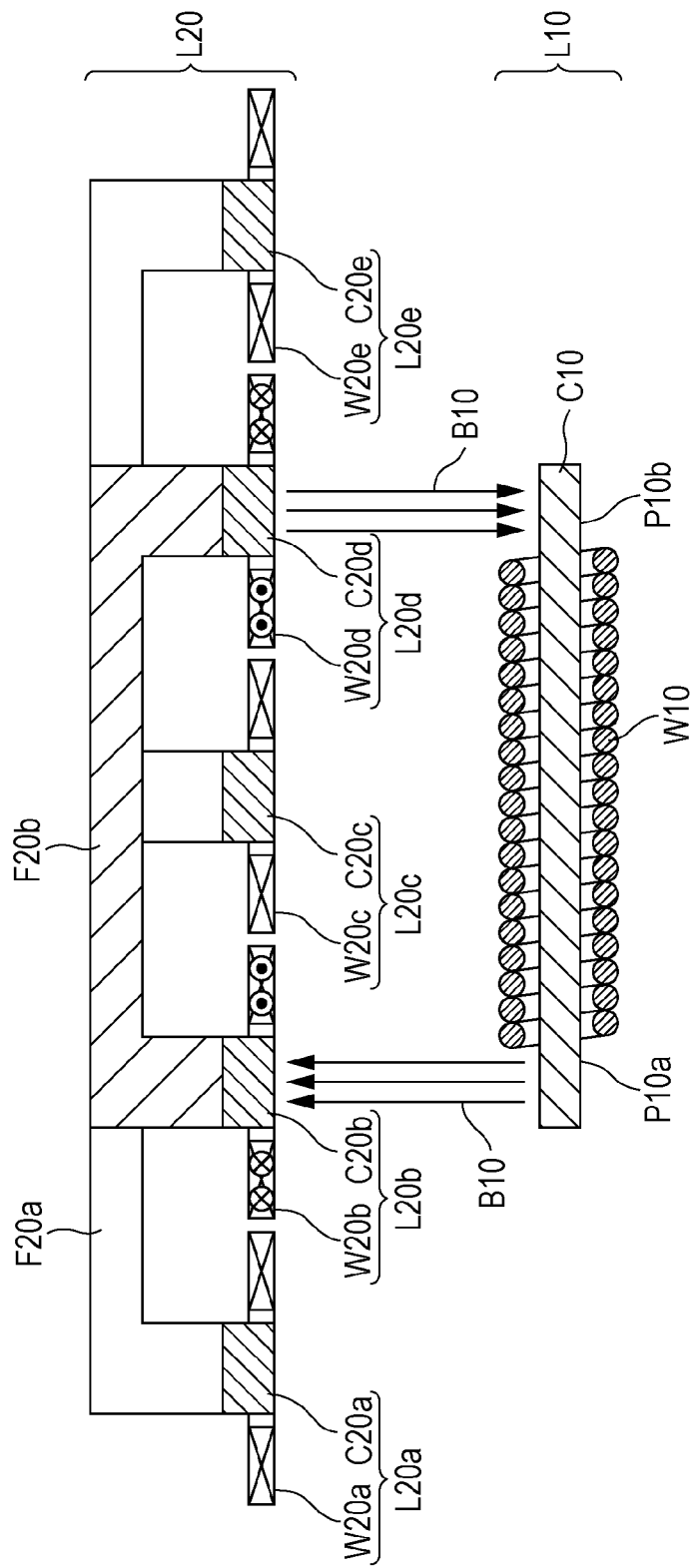

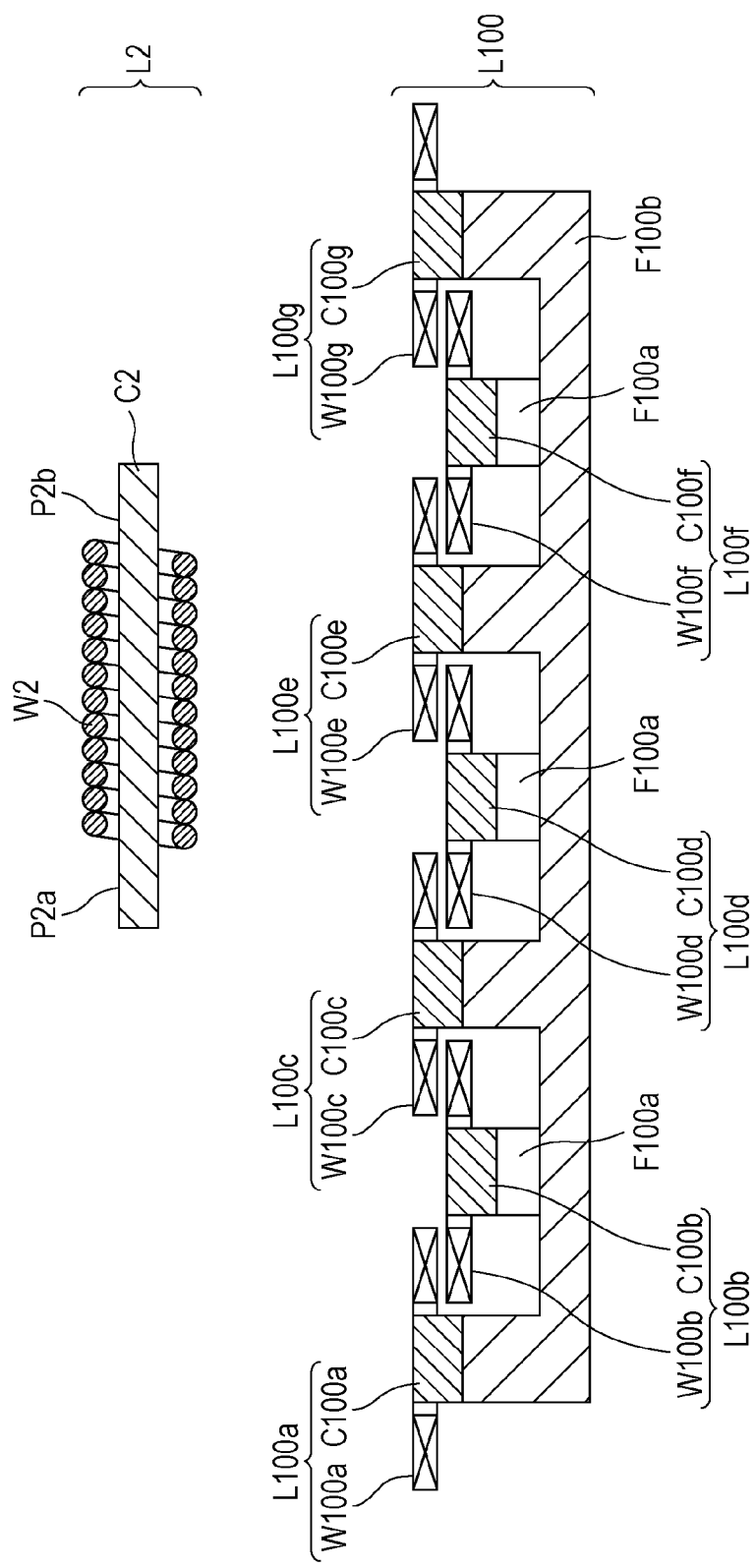

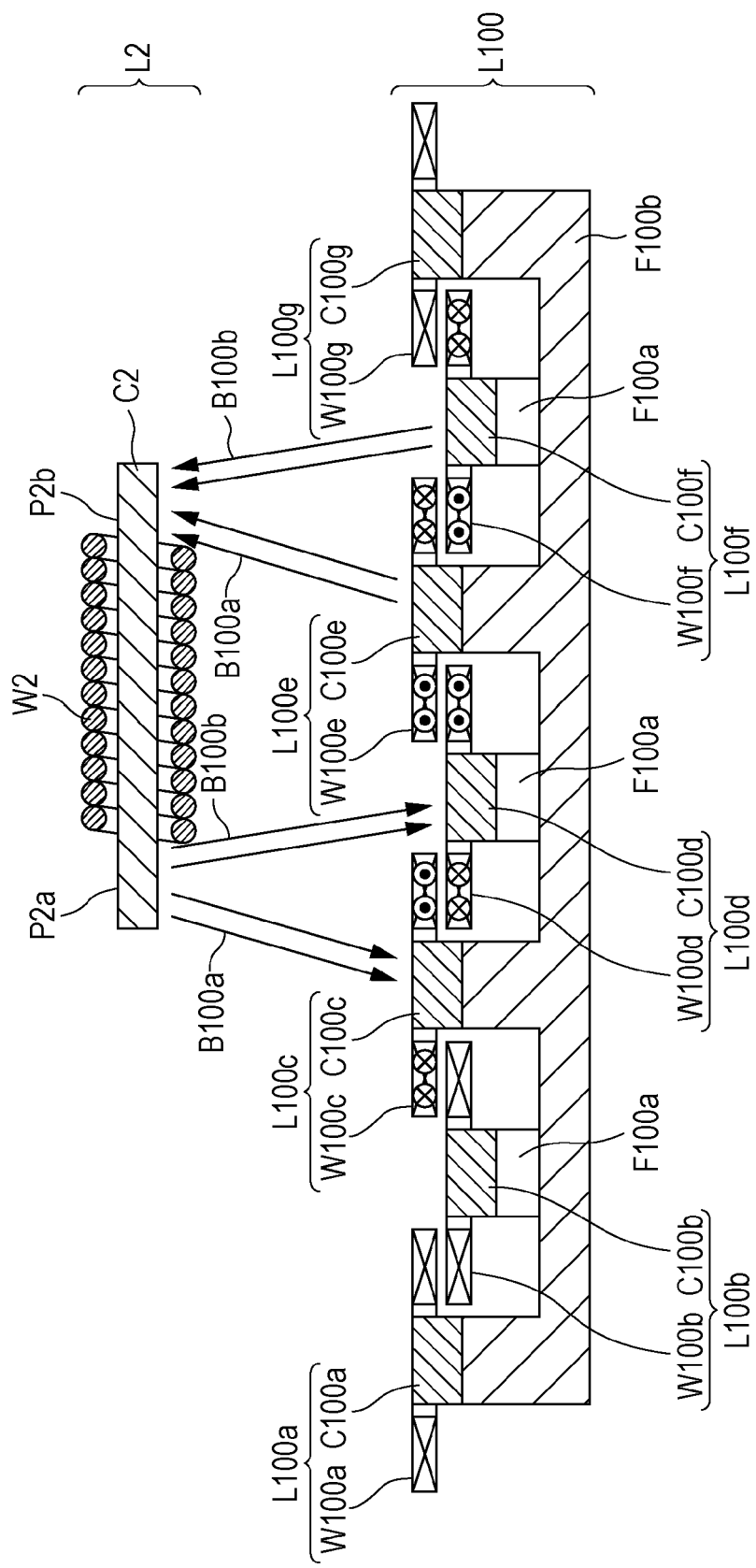

COIL FOR WIRELESS POWER TRANSMISSION AND WIRELESS POWER TRANSMISSION APPARATUS

BACKGROUND OF THE INVENTION

1. Field of the Invention

The present invention relates to a coil for wireless power transmission and a wireless power transmission apparatus.

2. Description of the Related Art

In recent years, in order to transmit power without mechanical contact by a cable or the like, a wireless power transmission technique that uses an electromagnetic induction effect between primary (power feeding) coils and secondary (power receiving) coils that face one another, has been of interest.

In the case where a wireless power transmission technique is applied to a power feeding apparatus to an electric vehicle or the like, it is assumed that a positional relationship between primary coils that are fixedly arranged on the ground or the like, and secondary coils that are installed in an electric vehicle or the like, is not necessarily constant. Accordingly, there has been a rise in the demand for the development of wireless power transmission technique in which power transmission is also possible in a case in which positional shift occurs between the primary coils and the secondary coils.

In response to such demands, for example, in Japanese Unexamined Patent Application Publication No. 2009-164293, a non-contact power transmission apparatus has been suggested in which a primary side is configured by a plurality of planar coils and a secondary side is configured by one or more planar coils, and an external diameter of the secondary side coils is smaller than an external diameter of the primary side coils.

However, in the technique that is disclosed in Japanese Unexamined Patent Application Publication No. 2009-164293, the primary side coils are configured by a plurality of planar coils, and therefore magnetic leakage flux that flows to adjacent coils in the primary side is increased. As a result, a closed loop is formed between adjacent coils in the primary side to cause a problem in that coupling deteriorates in a case in which a distance is large between the primary side coils and the secondary side coils, where power transmission is intended.

SUMMARY OF THE INVENTION

Accordingly, it is an object of the present invention to provide a coil for wireless power transmission and a wireless power transmission apparatus that can suppress deterioration in coupling even in a case in which a distance between coils, where power transmission is intended, is large, in addition to being able to maintain a high power transmission efficiency even in a case in which positional shift occurs between the coils where power transmission is intended.

A coil for wireless power transmission according to an aspect of the present invention is the coil that transmits or receives power wirelessly and includes a plurality of coils, and a plurality of magnetic connection members. The plurality of magnetic connection members are disposed in a manner which magnetically connects coils among the plurality of coils, which are adjacent with one or more coils therebetween, and does not magnetically connect coils among the plurality of coils, which are next to each other, and, in adjacent coils among the plurality of coils, which are magnetically connected, directions of magnetic fields that are generated when a current flows through the coils are mutually inverse directions.

According to the aspect of the present invention, the coil for wireless power transmission is provided with a plurality of coils. Therefore, it is possible to expand a range within which power feeding or power receiving is possible. Accordingly, it is possible to maintain a high power transmission efficiency even in a case in which positional shift occurs between coils where power transmission is performed.

In addition, in the coil for wireless power transmission according to the aspect of the invention, the plurality of magnetic connection members are disposed in a manner which magnetically connects coils among the plurality of coils, which are adjacent with one or more coils therebetween, and does not magnetically connect coils among the plurality of coils, which are next to each other. Therefore, in comparison with coils which are not magnetically connected by the magnetic connection members and which are next to each other, it is easier to form loops of magnetic fluxes in coils, which are magnetically connected by the magnetic connection members, and which are adjacent with one or more coils therebetween. As a result of this, since the formation of a closed loop is suppressed in coils which are next to each other, it is possible to suppress deterioration in coupling even in a case in which a distance between coils, where power transmission is performed, is large. In this instance, "magnetically connects" refers to a circumstance of setting a state in which a magnetic path is easily formed by reducing the magnetic resistance between coils, which are connected, and "does not magnetically connect" refers to the fact that there is no intentional lowering of the magnetic resistance between coils. That is, in this instance, "does not magnetically connect coils" does not refer to magnetic coupling between coils being 0, and therefore, does not exclude circumstances in which magnetic resistance between adjacent coils has been reduced incidentally.

Furthermore, in the coil for wireless power transmission according to the aspect of the invention, in adjacent coils among the plurality of coils which are magnetically connected, directions of magnetic fields that are generated when a current flows through the coils are mutually inverse directions. Therefore, magnetic fluxes which respectively interlink coils that are magnetically connected by a magnetic connection member form loops. As a result of this, since it is possible to selectively generate loops of magnetic fluxes that are suitable for power transmission even in a case in which a distance between coils, where power transmission is performed, is large, it is possible to suppress deterioration in coupling.

A coil for wireless power transmission according to another aspect of the present invention is the coil that transmits or receives power wirelessly and includes a plurality of coils, and a plurality of magnetic connection members that are disposed in a manner in which the magnetic connection members do not contact with one another. Each of the plurality of magnetic connection members includes a plurality of facing parts that face coils that configure the plurality of coils, the plurality of facing parts include one or more first portions and a plurality of second portions that are positioned with at least one first portion therebetween, a distance between the second portions and coils that face the second portions is shorter than a distance between the first portions and coils that face the first portions, and in adjacent coils among the plurality of coils that face the plurality of second portions, directions of magnetic fields that are generated when a current flows through the coils are mutually inverse directions.

According to the aspect of the present invention, the coil for wireless power transmission is provided with a plurality of coils. Therefore, it is possible to expand a range within which power feeding or power receiving is possible. Accordingly, it is possible to maintain a high power transmission efficiency even in a case in which positional shift occurs between coils where power transmission is performed.

In addition, in the coil for wireless power transmission according to the aspect of the invention, each of the plurality of magnetic connection members, which are disposed in a manner in which the magnetic connection members do not contact with one another, includes a plurality of facing parts that face coils that configure the plurality of coils, the plurality of facing parts include one or more first portions, and a plurality of second portions that are positioned with at least one first portion therebetween, and a distance between the second portions and coils that face the second portions is shorter than a distance between the first portions and coils that face the first portions. In this instance, since a distance between the second portions and coils that face the second portions is shorter than a distance between the first portions and coils that face the first portions, magnetic coupling of the coils that face the second portions and the magnetic connection member is greater than magnetic coupling of the coils that face the first portions and the magnetic connection member. In this state, since the plurality of second portions are positioned with at least one first portion therebetween, the plurality of magnetic connection members are disposed in a manner which magnetically connects coils among the plurality of coils, which face the second portions, and does not magnetically connect coils which face the first portions and coils which face the second portions among the plurality of coils. Therefore, in comparison with a coil that faces a first portion and a coil that faces a second portion, which are not magnetically connected by the magnetic connection members, and which are next to each other, it is easier to form loops of magnetic fluxes in coils, which are magnetically connected by the magnetic connection members, and which face the second portions. As a result of this, since the formation of a closed loop is suppressed in a coil that faces a first portion and a coil that faces a second portion, which are next to each other, it is possible to suppress deterioration in coupling even in a case in which a distance between coils, where power transmission is performed, is large. In this instance, a distance between either the first or the second portions and the coils refers to a distance between the first or the second portions and a magnetic core in a case in which the coils are provided with a magnetic core, and refers to a distance between either the first or the second portions and the centers of the coils in a case in which the coils are not provided with a magnetic core.

Furthermore, in the coil for wireless power transmission according to the aspect of the invention, in adjacent coils among the plurality of coils that face the plurality of second portions, directions of magnetic fields that are generated when a current flows through the coils are mutually inverse directions. Therefore, magnetic fluxes, which interlink coils that are magnetically connected by a magnetic connection member form loops. As a result of this, since it is possible to selectively generate loops of magnetic fluxes that are suitable for power transmission even in a case in which a distance between coils, where power transmission is performed, is large, it is possible to suppress deterioration in coupling. However, "adjacent coils among the coils that face the second portions" refers to adjacent coils among coils which face second portions that are included in a single magnetic connection member, and directions of magnetic fields that are generated when a current flows through the adjacent coils among coils which face second portions that are included in different magnetic connection members, need not necessarily be a mutually inverse direction.

It is preferable that the plurality of coils are disposed so that at least a part of winding wires of adjacent coils overlap each other. In this case, a disposition interval between the plurality of coils is reduced, and therefore, it is possible to generate a magnetic flux that contributes to power transmission in a compact manner. Accordingly, it is possible to further suppress deterioration in coupling between coils where power transmission is performed even in a case in which positional shift occurs between the coils where power transmission is performed.

A wireless power transmission apparatus according to an aspect of the present invention is the apparatus which wirelessly transmits power and includes the abovementioned coil for wireless power transmission, and a helical-shaped coil in which winding wires are wound around a rod-shaped or a plate-shaped magnetic path core. The magnetic path core includes magnetic pole parts at both ends thereof, and a distance between the magnetic pole parts, and a distance between the centers of adjacent coils among the plurality of coils of the coil for wireless power transmission, which are magnetically connected, is substantially equal.

According to the aspect of the present invention, it is possible to suppress deterioration in coupling even in a case in which a distance between coils, where power transmission is performed, is large, in addition to being able to maintain a high power transmission efficiency even in a case in which positional shift occurs between the coils where power transmission is performed. In addition, a distance between the centers of adjacent coils among the plurality of coils, which are magnetically connected, is substantially equal to a distance between the magnetic pole parts of a helical-shaped coil, which face the coils, and in which winding wires are wound around a rod-shaped or a plate-shaped magnetic path core. Therefore, since a magnetic path of a magnetic flux between coils where power transmission is performed is formed with the shortest path, it is possible to further suppress deterioration in coupling between the coils where power transmission is performed.

Effects of the Invention

According to an aspect of the present invention it is possible to provide a coil for wireless power transmission and a wireless power transmission apparatus that can suppress deterioration in coupling even in a case in which a distance between coils, where power transmission is performed, is large, in addition to being able to maintain a high power transmission efficiency even in a case in which positional shift occurs between the coils where power transmission is performed.

BRIEF DESCRIPTION OF THE DRAWINGS

FIG. 4 is an exploded perspective view that illustrates a plurality of magnetic connection members of FIG. 3 in further detail.

FIG. 5B is a cross-sectional view that illustrates an facing state (a relative positional relationship) of a plurality of coils and a receiving coil for describing a power feeding operation.

FIG. 8 is an exploded perspective view of the coil for wireless power transmission according to the second embodiment of the present invention.

FIG. 9 is an exploded perspective view that illustrates a plurality of magnetic connection members of FIG. 8 in further detail.

FIG. 10A is a cross-sectional view that illustrates an facing state (a relative positional relationship) of a power transmission coil and a plurality of coils for describing a power feeding operation.

FIG. 11 is a cross-sectional view that illustrates a coil for wireless power transmission according to a third embodiment of the present invention along with a receiving coil.

FIG. 12 is a cross-sectional view that illustrates an facing state (a relative positional relationship) of a plurality of coils and a receiving coil for describing a power feeding operation.

DESCRIPTION OF THE PREFERRED EMBODIMENTS

Forms (embodiments) for implementing the present invention will be described in detail with reference to the drawings. Additionally, in the following description, like components and components that have the same function will be given the same symbols, and overlapping descriptions thereof will be omitted.

First Embodiment

Figure 1:
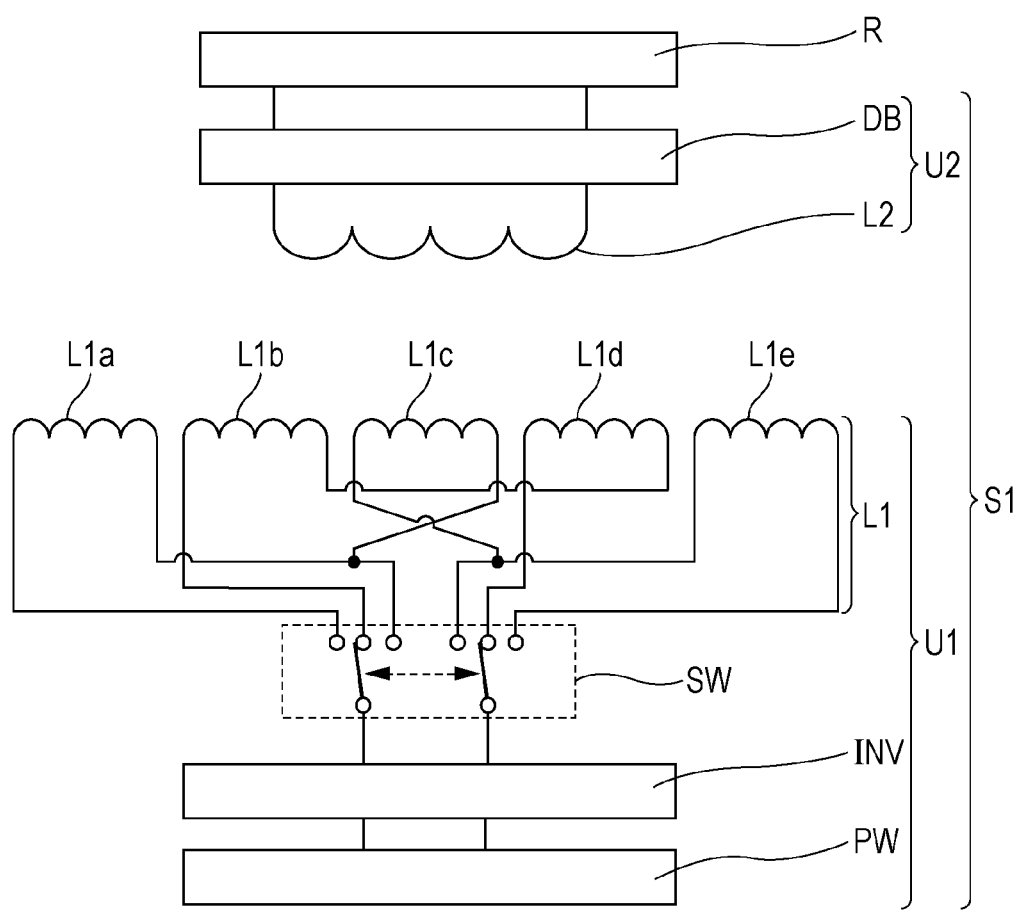
FIG. 1 is a system configuration diagram that illustrates a wireless power transmission apparatus according to a first embodiment of the present invention along with a load.
Figure 2:
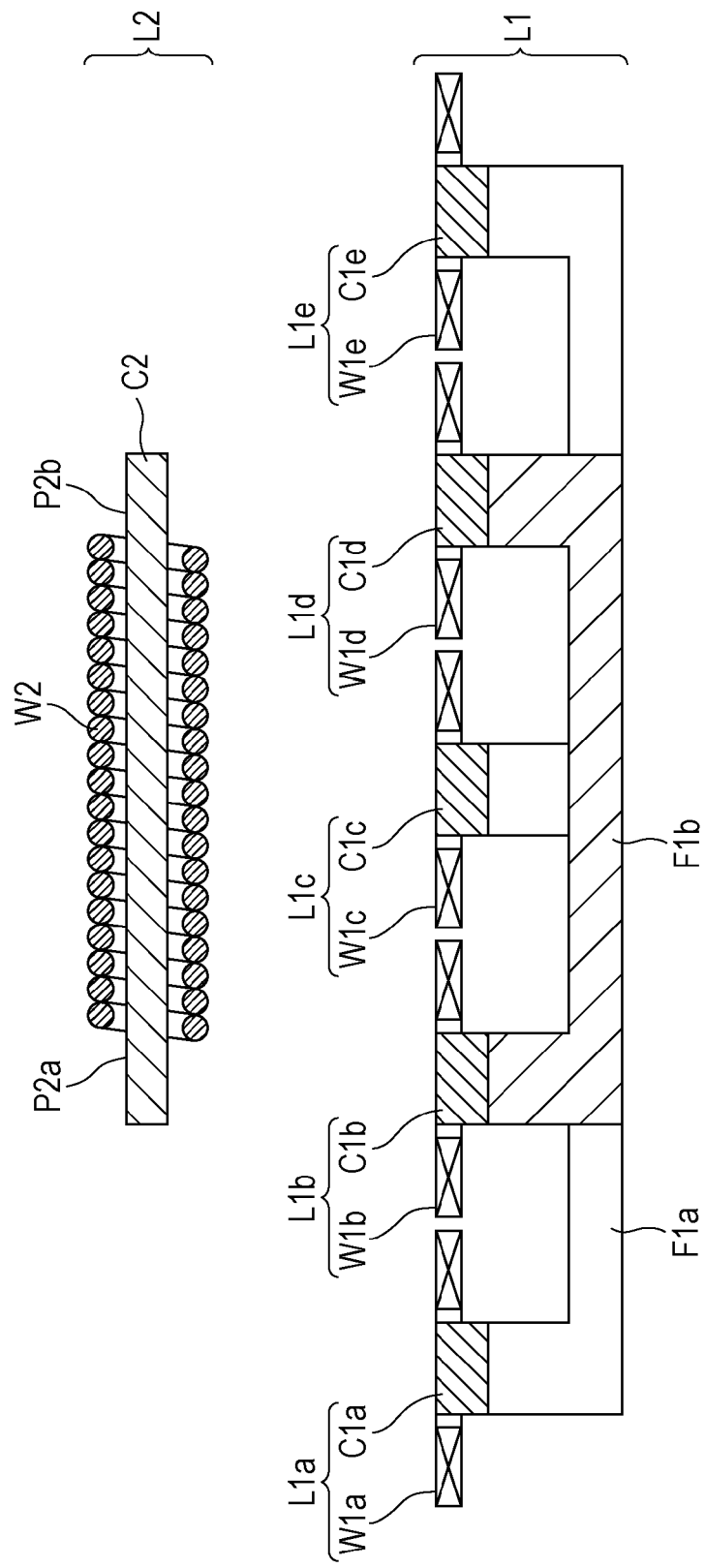
FIG. 2 is a cross-sectional view that illustrates a coil for wireless power transmission according to the first embodiment of the present invention along with a receiving coil.
Figure 3:
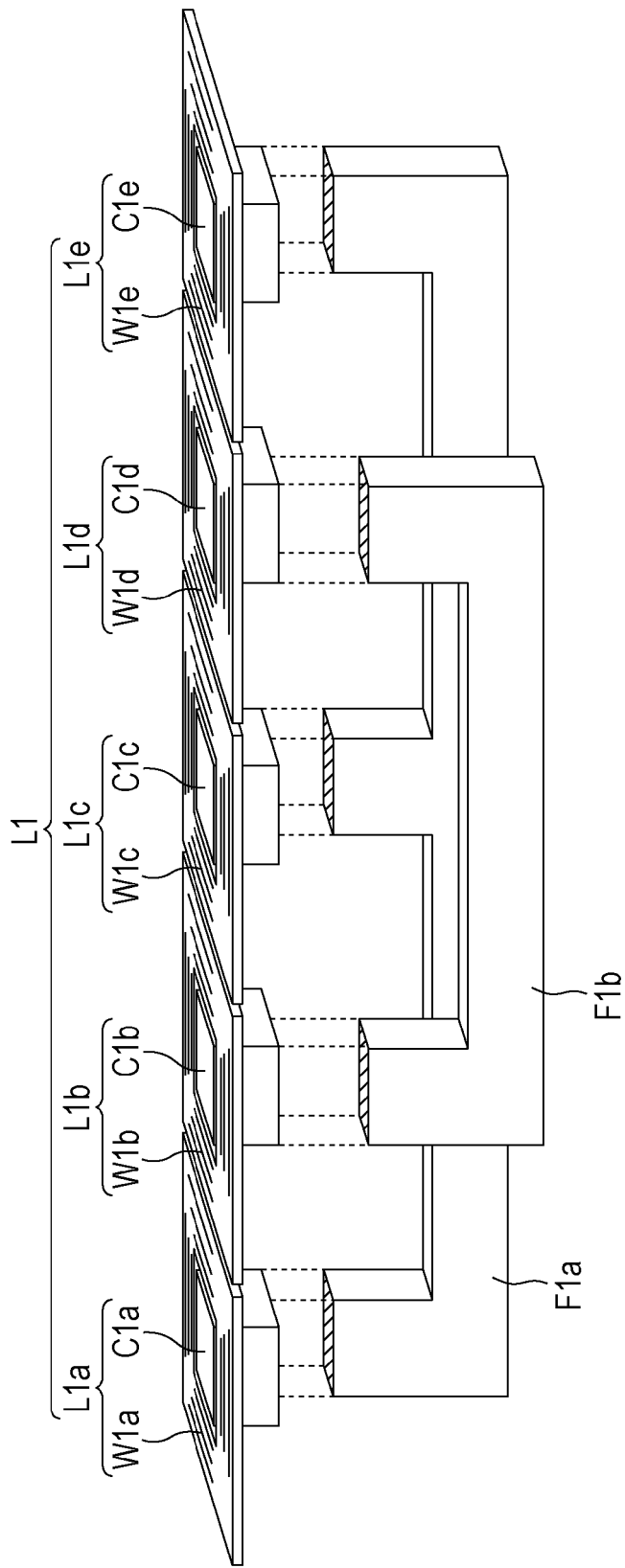
FIG. 3 is an exploded perspective view of the coil for wireless power transmission according to the first embodiment of the present invention.

First, a configuration of a wireless power transmission apparatus S1 according to a first embodiment of the present invention will be described with reference to FIGS. 1 to 4. FIG. 1 is a system configuration diagram that illustrates a wireless power transmission apparatus according to the first embodiment of the present invention along with a load. FIG. 2 is a cross-sectional view that illustrates a coil for wireless power transmission according to the first embodiment of the present invention along with a receiving coil. FIG. 3 is an exploded perspective view of the coil for wireless power transmission according to the first embodiment of the present invention. FIG. 4 is an exploded perspective view that illustrates a plurality of magnetic connection members of FIG. 3 in further detail.

As illustrated in FIG. 1, the wireless power transmission apparatus S1 includes a wireless power transmission device U1, and a wireless power receiving device U2. In this instance, in the present embodiment, description will be given using an example in which a coil for wireless power transmission L1 is installed in the wireless power transmission device U1.

The wireless power transmission device U1 includes a power source PW, an inverter INV, a coil for wireless power transmission L1, and a synchronization switch SW. The power source PW supplies DC power to the inverter INV, which will be described later. The power source PW is not particularly limited as long as the power source PW outputs DC power, and it is possible to include a DC power source in which a commercial AC power source is rectified and smoothed, a secondary battery, a DC power source that is generated using solar power, or a switching power source device such as a switching converter, or the like as an example of the power source PW.

The inverter INV has a function of converting input DC power that is supplied from the power source PW into AC power. In the present embodiment, the inverter INV converts input DC power that is supplied from the power source PW into AC power, and supplies the AC power to the coil for wireless power transmission L1, which will be described later. The inverter INV is configured from a switching circuit in which a plurality of switching elements are bridge connected. For example, it is possible to include an element such as a Metal Oxide Semiconductor Field-Effect Transistor (MOS-FET) or an Insulated Gate Bipolar Transistor (IGBT), as an example of the switching elements that configure the switching circuit.

As illustrated in FIGS. 2 and 3, the coil for wireless power transmission L1 includes a plurality of coils L1a to L1e, and a plurality of magnetic connection members F1a and F1b. Additionally, in a case in which the wireless power transmission apparatus S1 according to the present embodiment is adopted in power feeding equipment for a vehicle such as an electric vehicle, the coil for wireless power transmission L1 is fixedly arranged on the ground or in the vicinity of the ground.

The plurality of coils L1a to L1e are respectively provided with cores C1a to C1e and winding wires W1a to W1e. The plurality of coils L1a to L1e are respectively coils which have a planar spiral structure that has a substantially square shape, and are formed by winding the winding wires W1a to W1e, which are configured from litz wire such as steel or aluminum, around the cores C1a to C1e. In the present embodiment, the plurality of coils L1a to L1e are configured from five coils, and is disposed arrayed in a single row in the order of the coil L1a, the coil L1b, the coil L1c, the coil L1d and the coil L1e. That is, the plurality of coils L1a to L1e are disposed so that the coil L1a is next to the coil L1b, the coil L1b is next to the coil L1c, the coil L1c is next to the coil L1d, and the coil L1d is next to the coil L1e. The number of turns in each of the plurality of coils L1a to L1e is set as appropriate on the basis of a clearance between the plurality of coils L1a to L1e and a receiving coil L2, which will be described later, and a predetermined power transmission efficiency. In the present embodiment, the plurality of coils L1a to L1e function as power transmission coils that transmit AC power that is supplied from the inverter INV to the receiving coil L2, which will be described later, wirelessly.

The plurality of magnetic connection members F1a and F1b are disposed in a manner which magnetically connects coils among the plurality of coils L1a to L1e, which are adjacent with one or more coils therebetween, and does not magnetically connect coils among the plurality of coils L1a to L1e, which are next to each other. In the present embodiment, the magnetic connection member F1a is disposed so as to magnetically connect the coil L1a and the coil L1c, which are adjacent, with the coil L1b therebetween, and the coil L1c and the coil L1e, which are adjacent, with the coil L1d therebetween, and the magnetic connection member F1b is disposed so as to magnetically connect the coil L1b and the coil L1d, which are adjacent, with the coil L1c therebetween. As illustrated in FIG. 4, each of the plurality of magnetic connection members F1a and F1b includes a plurality of facing parts that face coils that configure the plurality of coils L1a to L1e, and the plurality of facing parts include first portions F1a11, F1a12 and F1b11, and second portions F1a21, F1a22, F1a23, F1b21 and F1b22. In the present embodiment, the first portion F1a11 of the magnetic connection member F1a faces the coil L1b, the first portion F1a12 faces the coil L1d, the second portion F1a21 faces the coil L1a, the second portion F1a22 faces the coil L1c, and the second portion F1a23 faces the coil L1e, and the first portion F1b11 of the magnetic connection member F1b faces the coil L1c, the second portion F1b21 faces the coil L1b, and the second portion F1b22 faces the coil L1d. In other words, the second portions F1a21, F1a22, F1a23, F1b21 and F1b22 of the magnetic connection members F1a and F1b are configured so as to be positioned with at least one of the first portions F1a11, F1a12 and F1b11 therebetween. In the present embodiment, the second portion F1a21 of the magnetic connection member F1a and the second portion F1a22 of the magnetic connection member F1a are positioned with the first portion F1a11 therebetween, the second portion F1a22 of the magnetic connection member F1a and the second portion F1a23 of the magnetic connection member F1a are positioned with the first portion F1a12 therebetween, and the second portion F1b21 of the magnetic connection member F1b and the second portion F1b22 of the magnetic connection member F1b are positioned with the first portion F1b11 therebetween. More specifically, a distance between the magnetic connection member F1a and the coil L1a, the magnetic connection member F1a and the coil L1c, and the magnetic connection member F1a and the coil L1e is shorter than a distance between the magnetic connection member F1a and the coil L1b, and the magnetic connection member F1a and the coil L1d, and a distance between the magnetic connection member F1b and the coil L1b, and the magnetic connection member F1b and the coil L1d is shorter than a distance between the magnetic connection member F1b and the coil L1a, the magnetic connection member F1b and the coil L1c, and the magnetic connection member F1b and the coil L1e. In other words, a distance between the second portion F1a21 of the magnetic connection member F1a and the coil L1a, the second portion F1a22 of the magnetic connection member F1a and the coil L1c, and the second portion F1a23 of the magnetic connection member F1a and the coil L1e is shorter than a distance between the first portion F1a11 of the magnetic connection member F1a and the coil L1b, and the first portion F1a12 of the magnetic connection member F1a and the coil L1d, and a distance between the second portion F1b21 of the magnetic connection member F1b and the coil L1b, and the second portion F1b22 of the magnetic connection member F1b and the coil L1d is shorter than a distance between the first portion F1b11 of the magnetic connection member F1b and the coil L1c. In this instance, a distance between either the first or the second portions and the coils refers to a distance between the first or the second portions and a magnetic core in a case in which the coils are provided with a magnetic core, and refers to a distance between either the first or the second portions and the centers of the coils in a case in which the coils are not provided with a magnetic core. As a result of configuring in this manner, a state in which magnetic resistance between the coil L1a, the coil L1c and the coil L1e is reduced by the magnetic connection member F1a, and therefore, a magnetic path is formed easily, is attained, and a state in which magnetic resistance between the coil L1b and the coil L1d is reduced by the magnetic connection member F1b, and therefore, a magnetic path is formed easily, is attained.

To explain in further detail, the magnetic connection members F1a and F1b have shapes that respectively include a plurality of protruding parts, and the plurality of protruding parts are provided so as to extend toward the central parts of coils among the plurality of coils L1a to L1e, which are adjacent with one or more coils therebetween. That is, the plurality of protruding parts of the magnetic connection member F1a respectively extend toward the central parts of the coil L1a, the coil L1c and the coil L1e, and the plurality of protruding parts of the magnetic connection member F1b respectively extend toward the central parts of the coil L1b and the coil L1d. In other words, the plurality of second portions of the magnetic connection member F1a are respectively disposed in close contact with the coil L1a, the coil L1c and the coil L1e, and the plurality of second portions of the magnetic connection member F1b are respectively disposed in close contact with the coil L1b and the coil L1d. That is to say, a leading end of a protruding part of the magnetic connection member F1a that extends toward the coil L1a configures the second portion F1a21, a leading end of a protruding part of the magnetic connection member F1a that extends toward the coil L1c configures the second portion F1a22, a leading end of a protruding part of the magnetic connection member F1a that extends toward the coil L1e configures the second portion F1a23, a leading end of a protruding part of the magnetic connection member F1b that extends toward the coil L1b configures the second portion F1b21 and a leading end of a protruding part of the magnetic connection member F1b that extends toward the coil L1d configures the second portion F1b22. In the present embodiment, the plurality of protruding parts of the magnetic connection member F1a are respectively physically connected to the core C1a of the coil L1a, the core C1c of the coil L1c and the core C1e of the coil L1e, and the plurality of protruding parts of the magnetic connection member F1b are respectively physically connected to the core C1b of the coil L1b, and the core C1d of the coil L1d. In addition, the magnetic connection member F1a and the magnetic connection member F1b are disposed in a manner in which the magnetic connection member F1a and the magnetic connection member F1b do not contact with one another. In other words, the magnetic connection member F1a and the magnetic connection member F1b are disposed so that magnetic resistance between the coils L1a, L1c and L1e to which the magnetic connection member F1a is magnetically connected, and the coils L1b and L1d to which the magnetic connection member F1b is magnetically connected is not intentionally reduced. Additionally, as a material of the plurality of magnetic connection members F1a and F1b, a magnetic material such as ferrite in which a magnetic permeability is high in comparison with the surrounding air is preferable. In this case, since it is also possible to cause the magnetic connection members F1a and F1b to function as portions of the cores of the coils, it is possible to suppress deterioration in coupling between coils where power transmission is performed while efficiently generating a magnetic flux. In addition, in a case in which the magnetic connection members F1a and F1b are caused to function as cores, the cores C1a to C1e of the coils L1a to L1e may be omitted. Additionally, in the present embodiment, the magnetic connection member F1a includes a plurality of protruding parts that extend toward the coils L1a, L1c and L1e, and the magnetic connection member F1b includes a plurality of protruding parts that extend toward the coils L1b and L1d, but the configuration of the present invention is not limited to this, and a configuration that includes protruding parts in which cores C1a, C1c and C1e of the coils L1a, L1c and L1e extend toward the magnetic connection member F1a, and protruding parts in which cores C1b and C1d of the coils L1b and L1d extend toward the magnetic connection member F1b, may also be used. That is, it is sufficient to configure so that a distance between the magnetic connection member F1a and the coil L1a, the magnetic connection member F1a and the coil L1c, and the magnetic connection member F1a and the coil L1e is shorter than a distance between the magnetic connection member F1a and the coil L1b, and the magnetic connection member F1a and the coil L1d, and a distance between the magnetic connection member F1b and the coil L1b, and the magnetic connection member F1b and the coil L1d is shorter than a distance between the magnetic connection member F1b and the coil L1a, the magnetic connection member F1b and the coil L1c, and the magnetic connection member F1b and the coil L1e.

The synchronization switch SW has a function of electrically connecting or blocking a connection between the plurality of coils L1a to L1e of the coil for wireless power transmission L1 and the inverter INV. More specifically, the synchronization switch SW electrically connects two coils to the inverter INV by selecting two coils among the plurality of coils L1a to L1e of the coil for wireless power transmission L1 for which respective distances to magnetic pole parts P2a and P2b that are formed at both ends of the receiving coil L2, which will be described later, are shortest, and is electrically connects the two coils to the inverter INV. At this time, the remaining coils and the inverter INV are electrically blocked. To explain in further detail, the synchronization switch SW is configured from two switches, and these two switches are continuously controlled to select and electrically connect any combination of the coil L1a and the coil L1c, the coil L1b and the coil L1d or the coil L1c and the coil L1e depending on a position of the receiving coil L2 with respect to the coil for wireless power transmission L1. That is, the synchronization switch SW selects and electrically connects a combination of two coils among the plurality of coils L1a to L1e, which are magnetically connected by the magnetic connection members F1a and F1b, and which are adjacent with one coil therebetween. It is possible to include a mechanical relay that is formed from two terminals or the like as an example of the synchronization switch SW. Additionally, switching control of the synchronization switch SW of electrical connection and blocking of the plurality of coils L1a to L1e and the inverter INV may be manual control, may be automatic control on the basis of the observation of positional shift of the wireless power receiving device U2 by an optical sensor (not shown in the drawings) or the like that the wireless power transmission device U1 is equipped with, or may be control that automatically selects a connection for which receiving power is highest by performing power transmission at relatively low power while switching the synchronization switch SW, and observing receiving power using radio communication (not shown in the drawings).

In the present embodiment, in coils among the plurality of coils L1a to L1e, which are magnetically connected to the inverter INV by the synchronization switch SW, that is, adjacent coils among the plurality of coils L1a to L1e, which are magnetically connected by the magnetic connection members F1a and F1b, directions of magnetic fields that are generated when a current flows through the coils are mutually inverse directions. In this instance, in order to make the directions of magnetic fields that are generated when a current flows through the adjacent coils among the plurality of coils L1a to L1e, which are magnetically connected, mutually inverse directions, it is sufficient to electrically connect the coils L1a to L1e in a manner in which the directions of magnetic fields that are mutually generated when a current flows through the adjacent coils among the plurality of coils L1a to L1e, which are magnetically connected, are mutually inverse directions. That is, in a case in which winding directions of the winding wires W1a to W1e of the plurality of coils L1a to L1e are the same direction, it is sufficient to connect in a manner in which the directions of currents that flow through the adjacent coils among the plurality of coils L1a to L1e, which are magnetically connected, are mutually inverse directions. In addition, in a case in which winding directions of the winding wires of adjacent coils among the plurality of coils L1a to L1e, which are magnetically connected, are mutually inverse directions, it is sufficient to connect in a manner in which the directions of currents that flow through adjacent coils among the plurality of coils L1a to L1e, which are magnetically connected, are mutually the same direction. Additionally, since "adjacent coils among the plurality of coils which are magnetically connected" and "adjacent coils among the plurality of coils that face the second portion" refer to the same coils, as a result of using a configuration such as that mentioned above, in adjacent coils among the coils L1a, L1c and L1e that face the second portions F1a21, F1a22 and F1a23 of the magnetic connection member F1a, and the coils L1b and L1d next to each other that face the second portions F1b21 and F1b22 of the magnetic connection member F1b, directions of magnetic fields that are generated when a current flows through the coils are mutually inverse directions.

The wireless power receiving device U2 includes the receiving coil L2, and a rectifying circuit DB. The receiving coil L2 is configured from a helical-shaped coil in which winding wires W2 are wound around a rod-shaped or a plate-shaped magnetic path core C2. By winding the winding wires W2 around the magnetic path core C2 in this manner, the magnetic pole parts P2a and P2b are formed at both ends of the magnetic path core C2. It is preferable that a distance between the magnetic pole part P2a and the magnetic pole part P2b is set to be substantially equal to a distance between the centers of adjacent coils among the plurality of coils L1a, L1c and L1e, which are magnetically connected by the magnetic connection member F1a or the plurality of coils L1b and L1d, which are magnetically connected by the magnetic connection member F1b. In this case, a magnetic path of a magnetic flux between coils that contribute to wireless power transmission is formed with the shortest path. That is, since it is possible to generate a magnetic flux that contributes to power transmission in the most efficient manner, it is possible to suppress deterioration in coupling between coils where power transmission is performed. In the present embodiment, the receiving coil L2 functions as a power receiving coil that receives AC power that is sent from the coil for wireless power transmission L1. Additionally, in a case in which the wireless power transmission apparatus S1 according to the present embodiment is adopted in power feeding equipment for a vehicle such as an electric vehicle, the receiving coil L2 is installed in a lower part of a vehicle.

The rectifying circuit DB has a function of rectifying the AC power that the receiving coil L2 receives to DC power. It is possible to include a conversion circuit that is provided with a full wave rectifying function that uses a diode bridge, and a power smoothing function that uses a capacitor and a 3-terminal regulator, or the like as an example of the rectifying circuit DB. The DC power that is rectified by the rectifying circuit DB is output to a load R. In this instance, in a case in which the wireless power transmission apparatus S1 according to the present embodiment is adopted in power feeding equipment for a vehicle such as an electric vehicle, it is possible to include a secondary battery or a rotator that is included in a vehicle as an example of the load R. Additionally, in a case in which the load R is an AC rotator, it is necessary to configure so that AC power is supplied to the AC rotator by adding an inverter (not shown in the drawings) between the rectifying circuit DB and the load R of the wireless power receiving device U2.

Next, a power feeding operation that corresponds to an facing state (a relative positional relationship) of a plurality of coils and a receiving coil will be described with reference to FIG. 5. FIG. 5A and FIG. 5B are cross-sectional views that illustrate facing states (relative positional relationships) of the plurality of coils L1a to L1e and the receiving coil L2 for describing a power feeding operation.

Figure 5A:
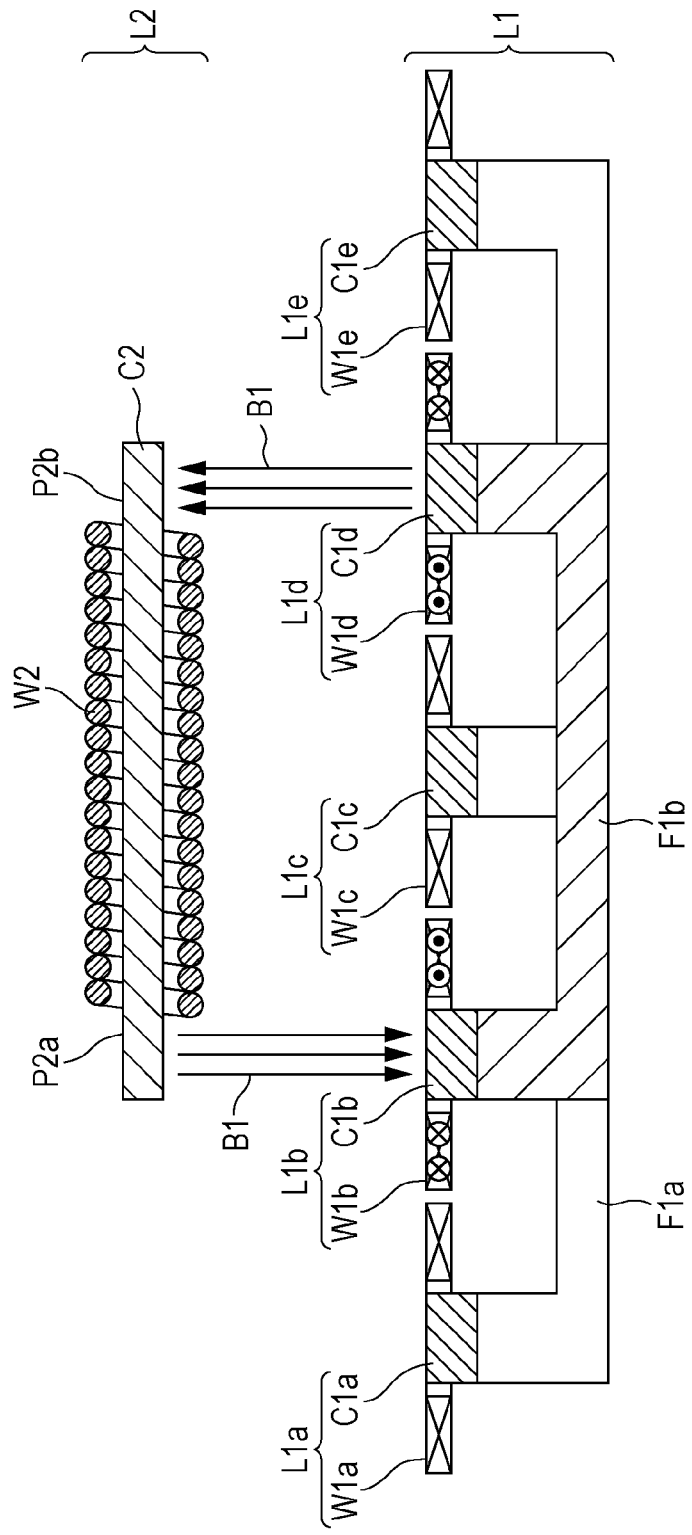
FIG. 5A is a cross-sectional view that illustrates an facing state (a relative positional relationship) of a plurality of coils and a receiving coil for describing a power feeding operation.

FIG. 5A illustrates a state in which the coils L1b, l1c and l1d and the receiving coil L2 are faced. More specifically, FIG. 5A illustrates a state in which the center of the coil L1b faces the magnetic pole part P2a of the receiving coil L2, and the center of the coil L1d faces the magnetic pole part P2b of the receiving coil L2. At this time, among the plurality of coils L1a to L1e, the coil L1b for which a distance to the magnetic pole part P2a of the receiving coil L2 is shortest, is selected by the synchronization switch SW and is electrically connected to the inverter INV. In addition, in the same manner, among the plurality of coils L1a to L1e, the coil L1d for which a distance to the magnetic pole part P2b of the receiving coil L2 is shortest, is selected by the synchronization switch SW and is electrically connected to the inverter INV. In other words, in the present example, among the plurality of coils L1a to L1e, the combination of the two coils L1b and L1d, which are adjacent with the coil L1c therebetween, and are magnetically connected by the magnetic connection member F2 is selected and electrically connected to the inverter INV by the synchronization switch SW. As a result of this, input DC power that is supplied from the power source PW is converted into AC power that is suitable for wireless power transmission by the inverter INV, and the AC power is supplied to the coils L1b and L1d via the synchronization switch SW. In the abovementioned manner, the coil L1b and the coil L1d are magnetically connected by the magnetic connection member F1b, and since directions of magnetic fields that are generated when a current flows through the coil L1b and the coil L1d are mutually inverse directions, a loop of a magnetic flux B1, which interlinks both the coil L1b and the coil L1d is formed. Since the magnetic flux B1 also interlinks the receiving coil L2, an electromotive force that corresponds to the magnetic flux B1 is produced in the winding wires W2 of the receiving coil L2. Further, the power that is produced in the receiving coil L2 is rectified by the rectifying circuit DB and output to the load R.

In this manner, since, in the coil L1b and the coil L1d that are selected according to the facing states (relative positional relationships) of the plurality of coils L1a to L1e and the receiving coil L2, directions of magnetic fields that are generated when a current flows through the coils L1b and L1d are mutually inverse directions, a loop of the magnetic flux B1 is formed between the coil L1b and the coil L1d. As a result of this, since it is possible to selectively generate a loop of the magnetic flux B1 that is suitable for power transmission even in a case in which a distance between coils, where power transmission is performed, is large, it is possible to suppress deterioration in coupling. In addition, since the coil L1b and the coil L1d are magnetically connected by the magnetic connection member F1b, the formation of a loop of a magnetic flux of the coils L1a, L1c and L1e which are adjacent, and are not magnetically connected is suppressed, and therefore, a loop of the magnetic flux B1 is formed easily in the coil L1b and the coil L1d. As a result of this, it is possible to suppress deterioration in coupling even in a case in which a distance between coils, where power transmission is performed, is large. Furthermore, in the coil L1b and the coil L1d, the respective distances to the magnetic pole parts P2a and P2b of the receiving coil L2 are the shortest, and since it is possible to form a magnetic path of a loop of the magnetic flux B1 that is formed in the coil L1b and the coil L1d with the shortest path, it is possible to suppress deterioration of the magnetic flux B1 that interlinks the receiving coil L2.

FIG. 5B illustrates a state in which the coils L1c, l1d and l1e and the receiving coil L2 are faced. More specifically, FIG. 5B illustrates a state in which the center of the coil L1c faces the magnetic pole part P2a of the receiving coil L2, and the center of the coil L1e faces the magnetic pole part P2b of the receiving coil L2. At this time, among the plurality of coils L1a to L1e, the coil L1c for which a distance to the magnetic pole part P2a of the receiving coil L2 is shortest, is selected by the synchronization switch SW and is electrically connected to the inverter INV. In addition, in the same manner, among the plurality of coils L1a to L1e, the coil L1e for which a distance to the magnetic pole part P2b of the receiving coil L2 is shortest, is selected by the synchronization switch SW and is electrically connected to the inverter INV. In other words, in the present example, among the plurality of coils L1a to L1e, the combination of the two coils L1c and L1e, which are magnetically connected by the magnetic connection member F1a, and which are adjacent with the coil L1d therebetween, is selected and electrically connected to the inverter INV by the synchronization switch SW. As a result of this, input DC power that is supplied from the power source PW is converted into AC power that is suitable for wireless power transmission by the inverter INV, and the AC power is supplied to the coils L1c and L1e via the synchronization switch SW. In the abovementioned manner, the coil L1c and the coil L1e are magnetically connected by the magnetic connection member F1a, and since directions of magnetic fields that are generated when a current flows through the coil L1c and the coil L1e are mutually inverse directions, a loop of a magnetic flux B2, which interlinks both the coil L1c and the coil L1e is formed. Since the magnetic flux B2 also interlinks the receiving coil L2, an electromotive force that corresponds to the magnetic flux B2 is produced in the winding wires W2 of the receiving coil L2. Further, the power that is produced in the receiving coil L2 is rectified by the rectifying circuit DB and output to the load R.

In this manner, since, in the coil L1c and the coil L1e that are selected according to the facing states (relative positional relationships) of the plurality of coils L1a to L1e and the receiving coil L2, directions of magnetic fields that are generated when a current flows through the coils L1c and L1e are mutually inverse directions, a loop of the magnetic flux B2 is formed between the coil L1c and the coil L1e. As a result of this, since it is possible to selectively generate a loop of the magnetic flux B2 that is suitable for power transmission even in a case in which a distance between coils, where power transmission is performed, is large, it is possible to suppress deterioration in coupling. In addition, since the coil L1c and the coil L1e are magnetically connected by the magnetic connection member F1a, the formation of a loop of an unnecessary magnetic flux that does not interlink the receiving coil L2 is suppressed between the adjacent coil L1b and the coil L1d which are adjacent, and are not magnetically connected is suppressed, and therefore, a loop of the magnetic flux B2, which interlinks the receiving coil L2 and contributes to power transmission, is formed easily in the coil L1c and the coil L1e. As a result of this, it is possible to suppress deterioration in coupling even in a case in which a distance between coils, where power transmission is performed, is large. Furthermore, in the coil L1c and the coil L1e, the respective distances to the magnetic pole parts P2a and P2b of the receiving coil L2 are the shortest, and since it is possible to form a magnetic path of a loop of the magnetic flux B2 that is formed in the coil L1c and the coil L1e with the shortest path, it is possible to suppress deterioration of the magnetic flux B2 that interlinks the receiving coil L2.

In the abovementioned manner, the wireless power transmission apparatus S1 is provided with the coil for wireless power transmission L1 as a power transmission coil, and the coil for wireless power transmission L1 is provided with the plurality of coils L1a to L1e. Therefore, it is possible to expand a range within which power feeding is possible. Accordingly, it is possible to maintain a high power transmission efficiency even in a case in which positional shift occurs between coils where power transmission is performed.

In addition, in the coil for wireless power transmission L1 according to an aspect of the present invention, the plurality of magnetic connection members F1a and F1b are disposed in a manner which magnetically connects coils among the plurality of coils L1a to L1e, which are adjacent with one or more coils therebetween, and does not magnetically connect coils among the plurality of coils, which are next to each other. Therefore, in comparison with adjacent coils, which are not magnetically connected by the magnetic connection members F1a and F1b, it is easier to form a loop of the magnetic fluxes B1 and B2 in coils, which are magnetically connected by the magnetic connection members F1a and F1b, and which are adjacent with one or more coils therebetween. As a result of this, since the formation of a closed loop is suppressed in adjacent coils it is possible to suppress deterioration in coupling even in a case in which a distance between coils, where power transmission is performed, is large.

Furthermore, in the coil for wireless power transmission L1 according to an aspect of the present invention, in adjacent coils among the plurality of coils L1a to L1e, which are magnetically connected, directions of magnetic fields that are generated when a current flows through the coils are mutually inverse directions. Therefore, magnetic fluxes B1 and B2, which respectively interlink coils that are magnetically connected by the magnetic connection members F1a and F1b form loops. As a result of this, since it is possible to selectively generate loops of the magnetic fluxes B1 and B2 that are suitable for power transmission even in a case in which a distance between coils, where power transmission is performed, is large, it is possible to suppress deterioration in coupling.

In addition, in the coil for wireless power transmission L1 according to an aspect of the invention, each of the plurality of magnetic connection members F1a and F1b, which are disposed in a manner in which the magnetic connection members F1a and F1b do not contact with one another, include a plurality of facing parts that face coils that configure the plurality of coils L1a to L1e, the plurality of facing parts include one or more first portions F1a11 and F1a12 (and F1b11), and a plurality of second portions F1a21, F1a22 and F1a23 (and F1b21 and F1b22) that are positioned with at least one first portion F1a11 and F1a12 (and F1b11) therebetween, and a distance between the F1a21, F1a22 and F1a23 (and F1b21 and F1b22) and the coils L1a, L1c and L1e (and L1b and L1d) that face the second portions F1a21, F1a22 and F1a23 (and F1b21 and F1b22) is shorter than a distance between the first portions F1a11 and F1a12 (and F1b11) and the coils L1b and L1d (and L1c) that face the first portions F1a11 and F1a12 (and F1b11). In this instance, since a distance between the second portions F1a21, F1a22 and F1a23 (and F1b21 and F1b22) and the coils L1a, L1c and L1e (and L1b and L1d) that face the second portions F1a21, F1a22 and F1a23 (and F1b21 and F1b22) is shorter than a distance between the first portions F1a11 and F1a12 (and F1b11) and the coils L1b and L1d (and L1c) that face the first portions F1a11 and F1a12 (and F1b11), magnetic coupling of the coils L1a, L1c and L1e (and L1b and L1d) that face the second portions F1a21, F1a22 and F1a23 (and F1b21 and F1b22) and the magnetic connection member F1a (F1b) is greater than magnetic coupling of the coils L1b and L1d (and L1c) that face the first portions F1a11 and F1a12 (and F1b11) and the magnetic connection member F1a (F1b). In this state, since the plurality of second portions F1a21, F1a22 and F1a23 (and F1b21 and F1b22) are positioned with at least one first portion F1a11 and F1a12 (and F1b11) therebetween, the plurality of magnetic connection members F1a and F1b are disposed in a manner which magnetically connects the coils L1a, L1c and L1e (and L1b and L1d) among the plurality of coils L1a to L1e, which face the second portions F1a21, F1a22 and F1a23 (and F1b21 and F1b22), and does not magnetically connect the coils L1b and L1d (and L1c) among the plurality of coils L1a to L1e, which face the first portions F1a11 and F1a12 (and F1b11) and the coils L1a, L1c and L1e (and L1b and L1d) which face the second portions F1a21, F1a22 and F1a23 (and F1b21 and F1b22). Therefore, in comparison with a coil L1b or L1d (or L1c) that faces a first portion F1a11 or F1a12 (or F1b11) and a coil L1a, L1c or L1e (or L1b or L1d) that faces a second portion F1a21, F1a22 or F1a23 (or F1b21 or F1b22), which are not magnetically connected by the magnetic connection members F1a and F1b, and which are next to each other, it is easier to form loops of magnetic fluxes magnetic fluxes B2 (and B1) in coils L1a, L1c and L1e (and L1b and L1d), which are magnetically connected by the magnetic connection members F1a and F1b, and which face the second portions F1a21, F1a22 and F1a23 (and F1b21 and F1b22). As a result of this, since the formation of a closed loop is suppressed in a coil L1b or L1d (or L1c) that faces a first portion F1a11 or F1a12 (or F1b11) or a coil L1a, L1c or L1e (or L1b or L1d) that faces a second portion F1a21, F1a22 r F1a23 (or F1b21 or F1b22), which are next to each other, it is possible to suppress deterioration in coupling even in a case in which a distance between coils, where power transmission is performed, is large.

Furthermore, in the coil for wireless power transmission L1 according to the aspect of the invention, in the adjacent coils among the plurality of coils L1$a$, L1$c$ and L1$e$ (and L1$b$ and L1$d$) that face the plurality of second portions F1$a$21, F1$a$22 and F1$a$23 (and F1$b$21 and F1$b$22), directions of magnetic fields that are generated when a current flows through the coils are mutually inverse directions. Therefore, the magnetic fluxes B1 and B2, which interlink coils that are magnetically connected by the magnetic connection members F1$a$ and F1$b$ form loops. As a result of this, since it is possible to selectively generate loops of the magnetic fluxes B1 and B2 that are suitable for power transmission even in a case in which a distance between coils, where power transmission is performed, is large, it is possible to suppress deterioration in coupling.

Second Embodiment

Figure 6:
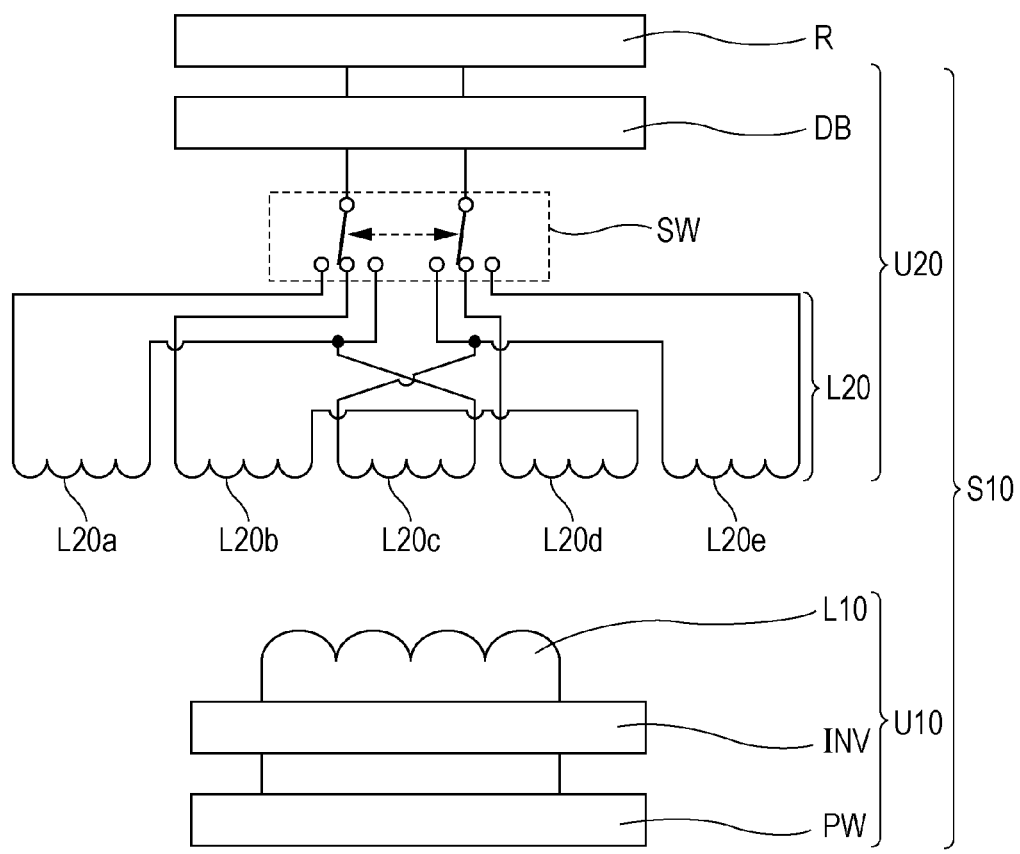
FIG. 6 is a system configuration diagram that illustrates a wireless power transmission apparatus according to a second embodiment of the present invention along with a load.
Figure 7:
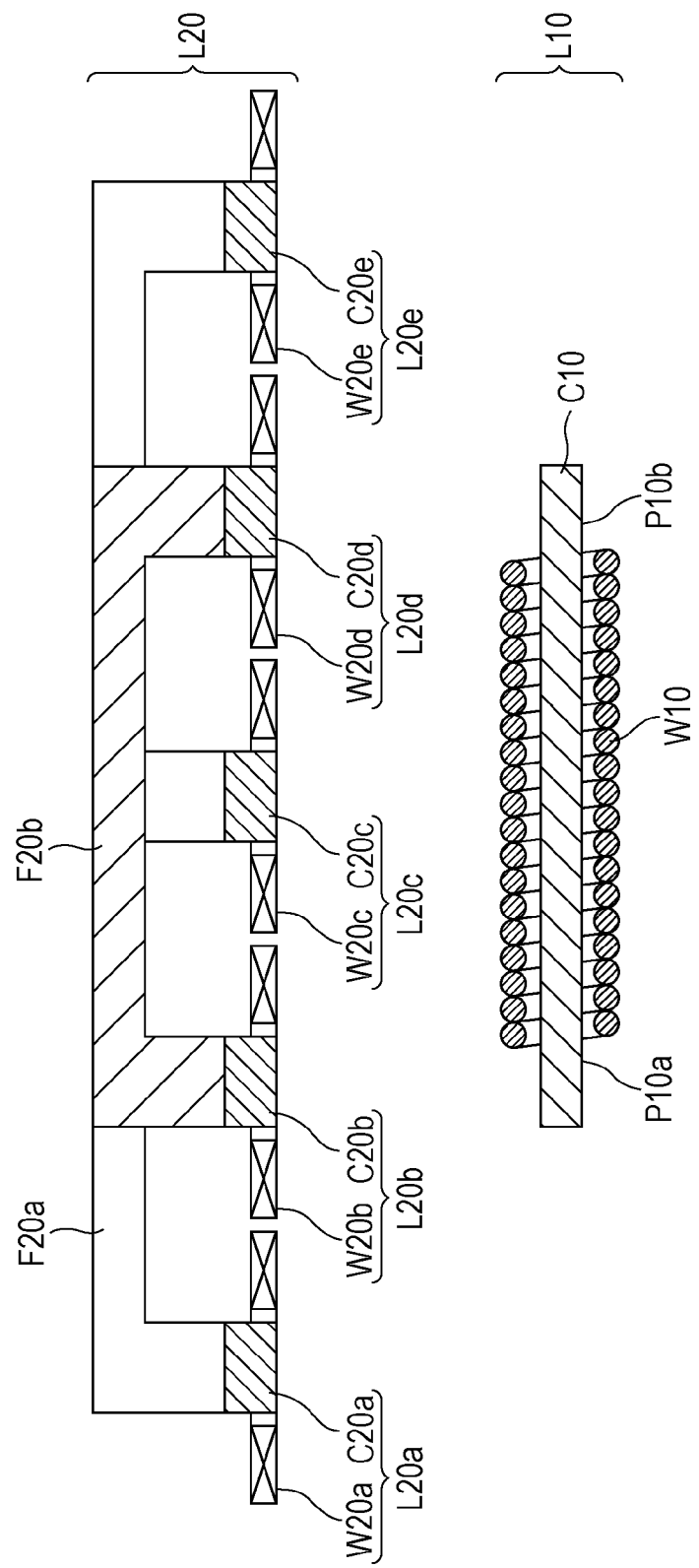
FIG. 7 is a cross-sectional view that illustrates a coil for wireless power transmission according to the second embodiment of the present invention along with a power transmission coil.

Next, a configuration of a wireless power transmission apparatus S10 according to a second embodiment of the present invention will be described with reference to FIGS. 6 to 9. FIG. 6 is a system configuration diagram that illustrates a wireless power transmission apparatus according to the second embodiment of the present invention along with a load. FIG. 7 is a cross-sectional view that illustrates a coil for wireless power transmission according to the second embodiment of the present invention along with a power transmission coil. FIG. 8 is an exploded perspective view of the coil for wireless power transmission according to the second embodiment of the present invention. FIG. 9 is an exploded perspective view that illustrates a plurality of magnetic connection members of FIG. 8 in further detail.

As illustrated in FIG. 6, the wireless power transmission apparatus S10 includes a wireless power transmission device U10, and a wireless power receiving device U20. In this instance, in the present embodiment, description will be given using an example in which a coil for wireless power transmission L20 is installed in the wireless power receiving device U20.

The wireless power transmission device U10 includes a power source PW, an inverter INV, a power transmission coil L10. The configurations of the power source PW and the inverter INV are the same as those in the wireless power transmission apparatus S1 according to the first embodiment. In the present embodiment, the wireless power transmission apparatus S10 differs from the wireless power transmission apparatus S1 according to the first embodiment in a feature of being provided with the power transmission coil L10 in place of the synchronization switch SW and the coil for wireless power transmission L1 of the wireless power transmission apparatus S1 according to the first embodiment. Hereinafter, description will be given focusing on features that differ from those of embodiment 1.

The power transmission coil L10 is configured from a helical-shaped coil in which winding wires W10 are wound around a rod-shaped or a plate-shaped magnetic path core C10. By winding the winding wires W10 around the magnetic path core C10 in this manner, magnetic pole parts P10$a$ and P10$b$ are formed at both ends of the magnetic path core C10. It is preferable that a distance between the magnetic pole parts P10$a$ and P10$b$ is set to be substantially equal to a distance between the centers of adjacent coils among a plurality of coils L20$a$, L20$c$ and L20$e$, which are magnetically connected by the magnetic connection member F20$a$, which will be described later, or a plurality of coils L20$b$ and L20$d$, which are magnetically connected by a magnetic connection member F20$b$, which will be described later. In this case, a magnetic path of a magnetic flux between coils that contribute to wireless power transmission is formed with the shortest path. That is, since it is possible to generate a magnetic flux that contributes to power transmission in the most efficient manner, it is possible to suppress deterioration in coupling between coils where power transmission is performed. In the present embodiment, the power transmission coil L10 functions as a power transmission coil that transmits AC power that is supplied from the inverter INV to the coil for wireless power transmission L20, which will be described later, wirelessly. Additionally, in a case in which the wireless power transmission apparatus S10 according to the present embodiment is adopted in power feeding equipment for a vehicle such as an electric vehicle, the power transmission coil L10 is fixedly arranged on the ground or in the vicinity of the ground.

The wireless power receiving device U20 includes the coil for wireless power transmission L20, the synchronization switch SW and the rectifying circuit DB. The configuration of the rectifying circuit DB is the same as that in the wireless power transmission apparatus S1 according to the first embodiment. In the present embodiment, the wireless power transmission apparatus S10 differs from the wireless power transmission apparatus S1 according to the first embodiment in a feature of being provided with the coil for wireless power transmission L20 and the synchronization switch SW in place of the receiving coil L2 of wireless power transmission apparatus S1 according to the first embodiment. Hereinafter, description will be given focusing on features that differ from those of embodiment 1.

As illustrated in FIGS. 7 and 8, the coil for wireless power transmission L20 includes a plurality of coils L20$a$ to L20$e$, and a plurality of magnetic connection members F20$a$ and F20$b$. Additionally, in a case in which the wireless power transmission apparatus S10 according to the present embodiment is adopted in power feeding equipment for a vehicle such as an electric vehicle, the coil for wireless power transmission L20 is installed in a lower part of a vehicle.

The plurality of coils L20$a$ to L20$e$ are respectively provided with cores C20$a$ to C20$e$ and winding wires W20$a$ to W20$e$. The plurality of coils L20$a$ to L20$e$ are respectively coils which have a planar spiral structure that has a substantially square shape, and are formed by winding the winding wires W20$a$ to W20$e$, which are configured from litz wire such as steel or aluminum, around the cores C20$a$ to C20$e$. In the present embodiment, the plurality of coils L20$a$ to L20$e$ are configured from five coils, and is disposed arrayed in a single row in the order of the coil L20$a$, the coil L20$b$, the coil L20$c$, the coil L20$d$ and the coil L20$e$. That is, the plurality of coils L20$a$ to L20$e$ are disposed so that the coil L20$a$ is next to the coil L20$b$, the coil L20$b$ is next to the coil L20$c$, the coil L20$c$ is next to the coil L20$d$, and the coil L20$d$ is next to the coil L20$e$. The number of turns in each of the plurality of coils L20$a$ to L20$e$ is set as appropriate on the basis of a clearance between the plurality of coils L20$a$ to L20$e$ and the power transmission coil L10, and a predetermined power transmission efficiency. In the present embodiment, the plurality of coils L20$a$ to L20$e$ function as power receiving coils that receives AC power that is sent from the power transmission coil L10 wirelessly.

The plurality of magnetic connection members F20$a$ and F20$b$ are disposed in a manner which magnetically connects coils among the plurality of coils L20$a$ to L20$e$, which are adjacent with one or more coils therebetween, and does not magnetically connect coils among the plurality of coils L20a to L20e, which are next to each other. As illustrated in FIG. 9, each of the plurality of magnetic connection members F20a and F20b includes a plurality of facing parts that face coils that configure the plurality of coils L20a to L20e, and the plurality of facing parts include first portions F20a11, F20a12 and F20b11, and second portions F20a21, F20a22, F20a23, F20b21 and F20b22. In the present embodiment, the first portion F20a11 of the magnetic connection member F20a faces the coil L20b, the first portion F20a12 faces the coil L20d, the second portion F20a21 faces the coil L20a, the second portion F20a22 faces the coil L20c, and the second portion F20a23 faces the coil L20e, and the first portion F20b11 of the magnetic connection member F20b faces the coil L20c, the second portion F20b21 faces the coil L20b, and the second portion F20b22 faces the coil L20d. In other words, the second portions F20a21, F20a22, F20a23, F20b21 and F20b22 of the magnetic connection members F20a and F20b are configured so as to be positioned with at least one of the first portions F20a11, F20a12 and F20b11 therebetween. In the present embodiment, the second portion F20a21 of the magnetic connection member F20a and the second portion F20a22 of the magnetic connection member F20a are positioned with the first portion F20a11 therebetween, the second portion F20a22 of the magnetic connection member F20a and the second portion F20a23 of the magnetic connection member F20a are positioned with the first portion F20a12 therebetween, and the second portion F20b21 of the magnetic connection member F20b and the second portion F20b22 of the magnetic connection member F20b are positioned with the first portion F20b11 therebetween. More specifically, a distance between the magnetic connection member F20a and the coil L20a, the magnetic connection member F20a and the coil L20c, and the magnetic connection member F20a and the coil L20e is shorter than a distance between the magnetic connection member F20a and the coil L20b, and the magnetic connection member F20a and the coil L20d, and a distance between the magnetic connection member F20b and the coil L20b, and the magnetic connection member F20b and the coil L20d is shorter than a distance between the magnetic connection member F20b and the coil L20a, the magnetic connection member F20b and the coil L20c, and the magnetic connection member F20b and the coil L20e. In other words, a distance between the second portion F20a21 of the magnetic connection member F20a and the coil L20a, the second portion F20a22 of the magnetic connection member F20a and the coil L20c, and the second portion F20a23 of the magnetic connection member F20a and the coil L1e is shorter than a distance between the first portion F20a11 of the magnetic connection member F20a and the coil L20b, and the first portion F20a12 of the magnetic connection member F20a and the coil L20d, and a distance between the second portion F20b21 of the magnetic connection member F20b and the coil L20b, and the second portion F20b22 of the magnetic connection member F20b and the coil L20d is shorter than a distance between the first portion F20b11 of the magnetic connection member F20b and the coil L20c. As a result of configuring in this manner, a state in which magnetic resistance between the coil L20a, the coil L20c and the coil L20e is reduced by the magnetic connection member F20a, and therefore, a magnetic path is formed easily, is attained, and a state in which magnetic resistance between the coil L20b and the coil L20d is reduced by the magnetic connection member F20b, and therefore, a magnetic path is formed easily, is attained. In the present embodiment, the magnetic connection member F20a is connected to the core C20a of the coil L20a and the core C20c of the coil L20c, which are adjacent with the coil L20b therebetween, and is connected to the core C20c of the coil L20c and the core C20e of the coil L20e, which are adjacent with the coil L20d therebetween, and the magnetic connection member F20b is connected to the core C20b of the coil L20b and the core C20d of the coil L20d, which are adjacent with the coil L20c therebetween. That is, the coil L20a, the coil L20c and the coil L20e are magnetically connected by the magnetic connection member F20a, and the coil L20b and the coil L20d are magnetically connected by the magnetic connection member F20b. Additionally, the magnetic connection member F20a and the magnetic connection member F20b are disposed in a manner in which the magnetic connection member F20a and the magnetic connection member F20b do not contact with one another. As a material of the plurality of magnetic connection members F20a and F20b, a magnetic material such as ferrite in which a magnetic permeability is high in comparison with the surrounding air is preferable.

The synchronization switch SW has a function of electrically connecting or blocking a connection between the plurality of coils L20a to L20e of the coil for wireless power transmission L20 and the rectifying circuit DB. More specifically, the synchronization switch SW electrically connects two coils to rectifying circuit DB by selecting two coils among the plurality of coils L20a to L20e of the coil for wireless power transmission L20 for which respective distances to the magnetic pole parts P10a and P10b that are formed at both ends of the power transmission coil L10, are shortest. At this time, the remaining coils and the rectifying circuit DB are electrically blocked. To explain in further detail, the synchronization switch SW is configured from two switches, and these two switches are continuously controlled to select and electrically connect any combination of the coil L20a and the coil L20c, the coil L20b and the coil L20d or the coil L20c and the coil L20e depending on a position of the power transmission coil L10 with respect to the coil for wireless power transmission L20. That is, the synchronization switch SW selects and electrically connects a combination of two coils among the plurality of coils L20a to L20e, which are magnetically connected by the magnetic connection members F20a and F20b, and which are adjacent with one coil therebetween.

In the present embodiment, in coils among the plurality of coils L20a to L20e, which are magnetically connected to the rectifying circuit DB by the synchronization switch SW, that is, adjacent coils among the plurality of coils L20a to L20e, which are magnetically connected by the magnetic connection members F20a and F20b, directions of magnetic fields that are generated when a current flows through the coils are mutually inverse directions. That is, in a case in which winding directions of the winding wires W20a to W20e of the plurality of coils L20a to L20e are the same direction, it is sufficient to connect in a manner in which the directions of currents that flow through the adjacent coils among the plurality of coils L20a to L20e, which are magnetically connected, are mutually inverse directions. In addition, in a case in which winding directions of the winding wires W20a to W20e of adjacent coils among the plurality of coils L20a to L20e, which are magnetically connected, are mutually inverse directions, it is sufficient to connect in a manner in which the directions of currents that flow through adjacent coils among the plurality of coils L20a to L20e, which are magnetically connected, are mutually the same direction. Additionally, in the present embodiment, the coil for wireless power transmission L20 that includes the plurality of coils L20a to L20e acts as a power receiving coil that generates a current using a magnetic field that is generated by the power transmission coil L10. Therefore, since directions of magnetic fields that are generated when a current flows through adjacent coils among the plurality of coils L20a to L20e, which are magnetically connected, are mutually inverse directions, when a magnetic flux which is in mutually inverse directions is interlinked in the coils, a phase of current that is respectively generated in the coils is rectified to a phase of current that is output to the rectifying circuit DB from the coil for wireless power transmission L20 via the synchronization switch SW. Additionally, since "adjacent coils among the plurality of coils which are magnetically connected" and "adjacent coils among the plurality of coils which face the second portion" refer to the same coils, as a result of using a configuration such as that mentioned above, in adjacent coils among the coils L20a, L20c and L20e that face the second portions F20a21, F20a22 and F20a23 of the magnetic connection member F20a, and the adjacent coils L20b and L20d that face the second portions F20b21 and F20b22 of the magnetic connection member F20b, directions of magnetic fields that are generated when a current flows through the coils are mutually inverse directions.

Next, a power feeding operation that corresponds to an facing state (a relative positional relationship) of a plurality of the power transmission coil L10 and the plurality of coils L20a to L20e will be described with reference to FIG. 10. FIG. 10A and FIG. 10B are cross-sectional views that illustrate facing states (relative positional relationships) of the power transmission coil and the plurality of coils L20a to L20e for describing a power feeding operation.

FIG. 10A illustrates a state in which the power transmission coil L10 and the coils L20b, L20c and L20d are faced. More specifically, FIG. 10A illustrates a state in which the magnetic pole part P10a of the power transmission coil L10 faces the center of the coil L20b, and the magnetic pole part P10b of the power transmission coil L10 faces the center of the coil L20d. At this time, among the plurality of coils L20a to L20e, the coil L20b for which a distance to the magnetic pole part P10a of the power transmission coil L10 is shortest, is selected by the synchronization switch SW and is electrically connected to the rectifying circuit DB, and the coil L20d for which a distance to the magnetic pole part P10b of the power transmission coil L10 is shortest, is selected by the synchronization switch SW and is electrically connected to the rectifying circuit DB. In other words, in the present example, among the plurality of coils L20a to L20e, the combination of the two coils L20b and L20d, which are magnetically connected by the magnetic connection member F20b, and which are adjacent with the coil L20c therebetween, is selected and electrically connected to the rectifying circuit DB by the synchronization switch SW. As a result of this, input DC power that is supplied from the power source PW is converted into AC power that is suitable for wireless power transmission by the inverter INV, and a loop of a magnetic flux B10, which interlinks the magnetic pole part P10a and the magnetic pole part P10b is formed by the power transmission coil L10 to which the AC power is supplied. Since the magnetic flux B10 also interlinks the coil L20b and the coil L20d, an electromotive force that corresponds to the magnetic flux B10 is produced in the coil for wireless power transmission L20. At this time, since, in the coils L20b and L20d, directions of magnetic fields that are generated when a current respectively flows through the coils are mutually inverse directions, when the magnetic flux which is in mutually inverse directions is interlinked in the coil L20b and the coil L20d, currents that are generated in the coils L20b and L20d are the same phase. Further, the power that is produced in the coil for wireless power transmission L20 is rectified by the rectifying circuit DB and output to the load R.

In this manner, since, in the coil L20b and the coil L20d that are selected according to the facing states (relative positional relationships) of the power transmission coil L10 and the plurality of coils L20a to L20e, directions of magnetic fields that are generated when a current flows through the coils L20b and L20d are mutually inverse directions, it is possible to transmit power efficiently using the magnetic flux B10, which interlinks the coil L20b and the coil L20d. In addition, since the coil L20b and the coil L20d are magnetically connected by the magnetic connection member F20b, the formation of a loop of a magnetic flux that interlinks the coils L20a, coil L20c and coil L20e, which are not magnetically connected, and which are adjacent is suppressed, and therefore, it is possible to selectively generate a loop of the magnetic flux B10, which interlinks the coil L20b and the coil L20d. As a result of this, it is possible to suppress deterioration in coupling even in a case in which a distance between coils, where power transmission is performed, is large. Furthermore, in the coil L20b and the coil L20d, the respective distances to the respective magnetic pole parts P10a and P10b of the power transmission coil L10 are the shortest, and since it is possible to form a magnetic path of a loop of the magnetic flux B10 that is formed in the coil L20b and the coil L20d with the shortest path, it is possible to suppress deterioration of the magnetic flux B10 that interlinks the coil L20b and the coil L20d.

Figure 10B:
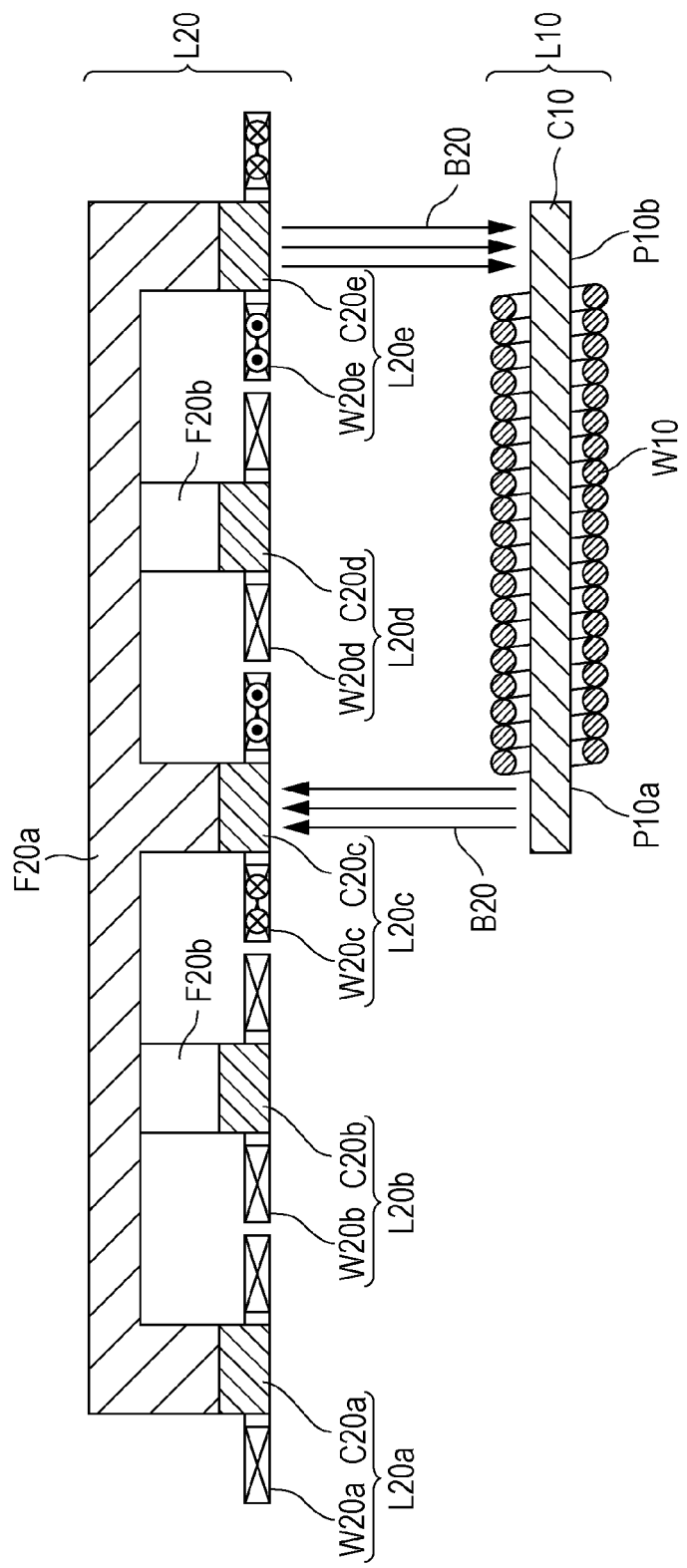
FIG. 10B is a cross-sectional view that illustrates an facing state (a relative positional relationship) of a power transmission coil and a plurality of coils for describing a power feeding operation.

FIG. 10B illustrates a state in which the power transmission coil L10 and the coils L20c, L20d and L20e are faced. More specifically, FIG. 10B illustrates a state in which the magnetic pole part P10a of the power transmission coil L10 faces the center of the coil L20c, and the magnetic pole part P10b of the power transmission coil L10 faces the center of the coil L20e. At this time, among the plurality of coils L20a to L20e, the coil L20c for which a distance to the magnetic pole part P10a of the power transmission coil L10 is shortest, is selected by the synchronization switch SW and is electrically connected to the rectifying circuit DB, and the coil L20e for which a distance to the magnetic pole part P10b of the power transmission coil L10 is shortest, is selected by the synchronization switch SW and is electrically connected to the rectifying circuit DB. In other words, in the present example, among the plurality of coils L20a to L20e, the combination of the two coils L20c and L20e, which are magnetically connected by the magnetic connection member F20a, and which are adjacent with the coil L20d therebetween, is selected and electrically connected to the rectifying circuit DB by the synchronization switch SW. As a result of this, input DC power that is supplied from the power source PW is converted into AC power that is suitable for wireless power transmission by the inverter INV, and a loop of a magnetic flux B20, which interlinks the magnetic pole part P10a and the magnetic pole part P10b is formed by the power transmission coil L10 to which the AC power is supplied. Since the magnetic flux B20 also interlinks the coil L20c and the coil L20e, an electromotive force that corresponds to the magnetic flux B20 is produced in the coil for wireless power transmission L20. At this time, since, in the coils L20c and L20e, directions of magnetic fields that are generated when a current respectively flows through the coils are mutually inverse directions, when the magnetic flux which is in mutually inverse directions is interlinked in the coil L20c and the coil L20e, currents that are generated in the coils L20c and L20e are the same phase. Further, the power that is produced in the coil for wireless power transmission L20 is rectified by the rectifying circuit DB and output to the load R.

In this manner, since, in the coil L20c and the coil L20e that are selected according to the facing states (relative positional relationships) of the power transmission coil L10 and the plurality of coils L20a to L20e, directions of magnetic fields that are generated when a current flows through the coils L20c and L20e are mutually inverse directions, it is possible to transmit power efficiently using the magnetic flux B20, which interlinks the coil L20c and the coil L20e. In addition, since the coil L20c and the coil L20e are magnetically connected by the magnetic connection member F20a, the formation of a loop of a magnetic flux that interlinks the coils L20b and coil L20d, which are not magnetically connected, and which are adjacent is suppressed, and therefore, it is possible to selectively generate a loop of the magnetic flux B20, which interlinks the coil L20c and the coil L20e. As a result of this, it is possible to suppress deterioration in coupling even in a case in which a distance between coils, where power transmission is performed, is large. Furthermore, in the coil L20c and the coil L20e, the respective distances to the respective magnetic pole parts P10a and P10b of the power transmission coil L10 are the shortest, and since it is possible to form a magnetic path of a loop of the magnetic flux B20 that is formed in the coil L20c and the coil L20e with the shortest path, it is possible to suppress deterioration of the magnetic flux B20 that interlinks the coil L20c and the coil L20e.

In the abovementioned manner, the wireless power transmission apparatus S10 is provided with the coil for wireless power transmission L20 as a power receiving coil, and the coil for wireless power transmission L20 is provided with the plurality of coils L20a to L20e. Therefore, it is possible to expand a range within which power receiving is possible. Accordingly, it is possible to maintain a high power transmission efficiency even in a case in which positional shift occurs between coils where power transmission is performed.

In addition, in the power transmission coil L10 according to an aspect of the present invention, the plurality of magnetic connection members F20a and F20b are disposed in a manner which magnetically connects coils among the plurality of coils L20a to L20e, which are adjacent with one or more coils therebetween, and does not magnetically connect coils among the plurality of coils L20a to L20e, which are next to each other. Therefore, in comparison with adjacent coils, which are not magnetically connected by the magnetic connection members F20a and F20b, it is easier to form a loop of the magnetic fluxes B10 and B20 in coils, which are magnetically connected by the magnetic connection members F20a and F20b, and which are adjacent with one or more coils therebetween. As a result of this, it is possible to suppress deterioration in coupling even in a case in which a distance between coils, where power transmission is performed, is large.

Furthermore, since, in the coil for wireless power transmission L10 according to an aspect of the present invention, in adjacent coils among the plurality of coils L20a to L20e, which are magnetically connected, directions of magnetic fields that are generated when a current flows through the coils are mutually inverse directions, when a magnetic flux which is in mutually inverse directions is interlinked in the coils, a phase of current that is respectively generated in the coils is rectified to a phase of current that is output to the rectifying circuit DB from the coil for wireless power transmission L20 via the synchronization switch SW. Therefore, it is possible to generate the power that is output to the rectifying circuit DB efficiently using the magnetic fluxes B10 and B20 which interlink coils among the plurality of coils L20a to L20e, which are connected by the magnetic connection members F20a and F20b, in mutually inverse directions. As a result of this, since it is even possible to selectively receive the power that is transmitted by the magnetic fluxes B10 and B20 that are generated by the power transmission coil L10 in a case in which a distance between coils, where power transmission is performed, is large, it is possible to suppress deterioration in coupling.

In addition, in the coil for wireless power transmission L20 according to an aspect of the invention, each of the plurality of magnetic connection members F20a and F20b, which are disposed in a manner in which the magnetic connection members F20a and F20b do not contact with one another, include a plurality of facing parts that face coils that configure the plurality of coils L20a to L20e, the plurality of facing parts include one or more first portions F20a11 and F20a12 (and F20b11), and a plurality of second portions F20a21, F20a22 and F20a23 (and F20b21 and F20b22) that are positioned with at least one first portion F20a11 and F20a12 (and F20a11) therebetween, and a distance between the second portions F20a21, F20a22 and F20a23 (and F20b21 and F20b22) and the coils L20a, L20c and L20e (and L20b and L20d) that face the second portions F20a21, F20a22 and F20a23 (and F20b21 and F20b22) is shorter than a distance between the first portions F20a11 and F20a12 (and F20b11) and the coils L20b and L20d (and L20c) that face the first portions F20a11 and F20a12 (and F20b11). In this instance, since a distance between the second portions F20a21, F20a22 and F20a23 (and F20b21 and F20b22) and the coils L20a, L20c and L20e (and L20b and L20d) that face the second portions F20a21, F20a22 and F20a23 (and F20b21 and F20b22) is shorter than a distance between the first portions F20a11 and F20a12 (and F20b11) and the coils L20b and L20d (and L20c) that face the first portions F20a11 and F20a12 (and F20b11), magnetic coupling of the coils L20a, L20c and L20e (and L20b and L20d) that face the second portions F20a21, F20a22 and F20a23 (and F20b21 and F20b22) and the magnetic connection member F20a (F20b) is greater than magnetic coupling of the coils L20b and L20d (and L20c) that face the first portions F20a11 and F20a12 (and F20b11) and the magnetic connection member F20a (F20b). In this state, since the plurality of second portions F20a21, F20a22 and F20a23 (and F20b21 and F20b22) are positioned with at least one first portion F20a11 and F20a12 (and F20b11) therebetween, the plurality of magnetic connection members F20a and F20b are disposed in a manner which magnetically connects the coils L20a, L20c and L20e (and L20b and L20d) among the plurality of coils L20a to L20e, which face the second portions F20a21, F20a22 and F20a23 (and F20b21 and F20b22), and does not magnetically connect the coils L20b and L20d (and L20c) among the plurality of coils L20a to L20e, which face the first portions F20a11 and F20a12 (and F20b11) and the coils L20a, L20c and L20e (and L20b and L20d) which face the second portions F20a21, F20a22 and F20a23 (and F20b21 and F20b22). Therefore, in comparison with a coil L20b or L20d (or L20c) that faces a first portion F20a11 or F20a12 (or F20b11) and a coil L20a, L20c or L20e (or L20b or L20d) that faces a second portion F20a21, F20a22 or F20a23 (or F20b21 or F20b22), which are not magnetically connected by the magnetic connection members F20a and F20b, and which are next to each other, it is easier to form loops of magnetic fluxes magnetic fluxes B20 (and B10) in coils L20a, L20c and L20e (and L20b and L20d), which are magnetically connected by the magnetic connection members F20a and F20b, and which face the second portions F20a21, F20a22 and F20a23 (and F20b21 and F20b22). As a result of this, since the formation of a closed loop is suppressed in a coil L20b or L20d (or L20c) that faces a first portion F20a11 or F20a12 (or F20b11) and a coil L20a, L20c or L20e (or L20b or L20d) that faces a second portion F20a21, F20a22 or F20a23 (or F20b21 or F20b22), which are next to each other, it is possible to suppress deterioration in coupling even in a case in which a distance between coils, where power transmission is performed, is large.

Furthermore, in the coil for wireless power transmission L20 according to the aspect of the invention, in the adjacent coils among the plurality of coils L20a, L20c and L20e (and L20b and L20d) that face the plurality of second portions F20a21, F20a22 and F20a23 (and F20b21 and F20b22) of the magnetic connection member F20a, since directions of magnetic fields that are generated when a current flows through the coils are mutually inverse directions, when a magnetic flux which is in mutually inverse directions is interlinked in the coils, a phase of current that is respectively generated in the coils is rectified to a phase of current that is output to the rectifying circuit DB from the coil for wireless power transmission L20 via the synchronization switch SW. Therefore, it is possible to generate the power that is output to the rectifying circuit DB efficiently using the magnetic fluxes B10 and B20 which interlink coils among the plurality of coils L20a to L20e, which are connected by the magnetic connection members F20a and F20b, in mutually inverse directions. As a result of this, since it is even possible to selectively receive the power that is transmitted by the magnetic fluxes B10 and B20 that are generated by the power transmission coil L10 in a case in which a distance between coils, where power transmission is performed, is large, it is possible to suppress deterioration in coupling.

Third Embodiment

Next, a wireless power transmission apparatus S100 according to a third embodiment of the present invention will be described.

The wireless power transmission apparatus S100 includes a wireless power transmission device U100 and a wireless power receiving device U2 in the same manner as the wireless power transmission apparatus S1 according to the first embodiment. In this instance, in the present embodiment, description will be given using an example in which a coil for wireless power transmission L100 is installed in the wireless power transmission device U100.

The wireless power transmission device U100 includes a power source PW, an inverter INV, a coil for wireless power transmission L100, and a synchronization switch SW. The configurations of the power source PW, the inverter INV and the synchronization switch SW are the same as those in the wireless power transmission apparatus S1 according to the first embodiment. In the present embodiment, the wireless power transmission apparatus S100 differs from the wireless power transmission apparatus S1 according to the first embodiment in a feature of being provided with the coil for wireless power transmission L100 in place of the coil for wireless power transmission L1 of the wireless power transmission apparatus S1 according to the first embodiment. Hereinafter, description will be given focusing on features that differ from those of embodiment 1.

First, the coil for wireless power transmission L100 will be described with reference to FIG. 11. FIG. 11 is a cross-sectional view that illustrates a coil for wireless power transmission according to a third embodiment of the present invention along with a receiving coil. As illustrated in FIG. 11, the coil for wireless power transmission L100 includes a plurality of coils L100a to L100g, and a plurality of magnetic connection members F100a and F100b. Additionally, in a case in which the wireless power transmission device U100 according to the present embodiment is adopted in power feeding equipment for a vehicle such as an electric vehicle, the coil for wireless power transmission L100 is fixedly arranged on the ground or in the vicinity of the ground.

The plurality of coils L100a to L100g are respectively provided with cores C100a to C100g and winding wires W100a to W100g. The plurality of coils L100a to L100g are respectively coils which have a planar spiral structure that has a substantially square shape, and are formed by winding the winding wires W100a to W100g, which are configured from litz wire such as steel or aluminum, around the cores C100a to C100g. In the present embodiment, the plurality of coils L100a to L100g are configured from seven coils, and are disposed arrayed in a single row in the order of the coil L100a, the coil L100b, the coil L100c, the coil L100d, the coil L100e, the coil L100f and the coil L100g. That is, the plurality of coils L100a to L100g are disposed so that the coil L100a is next to the coil L100b, the coil L100b is next to the coil L100c, the coil L100c is next to the coil L100d, the coil L100d is next to the coil L100e, the coil L100e is next to the coil L100f and the coil L100f is next to the coil L100g. The number of turns in each of the plurality of coils L100a to L100g are set as appropriate on the basis of a clearance between the plurality of coils L100a to L100g and the receiving coil L2, and a predetermined power transmission efficiency. In the present embodiment, the plurality of coils L100a to L100g function as power transmission coils that transmit AC power that is supplied from the inverter INV to the receiving coil L2, wirelessly.

Viewed from the receiving coil L2, the plurality of coils L100a to L100g are disposed so that at least a part of winding wires of coils, which are next to each other, overlap. More specifically, a part of the winding wire W100a of the coil L100a overlaps with a part of the winding wire W100b of the coil L100b, a part of the winding wire W100b of the coil L100b overlaps with a part of the winding wire W100c of the coil L100c, a part of the winding wire W100c of the coil L100c overlaps with a part of the winding wire W100d of the coil L100d, a part of the winding wire W100d of the coil L100d overlaps with a part of the winding wire W100e of the coil L100e, a part of the winding wire W100e of the coil L100e overlaps with a part of the winding wire W100f of the coil L100f, and a part of the winding wire W100f of the coil L100f overlaps with a part of the winding wire W100g of the coil L100g. If a width from an innermost peripheral winding wire to an outermost peripheral winding wire of the plurality of coils L100a to L100g, which have a spiral structure that is formed in planar form, is set as a winding wire width W, and a thickness of the winding wire is set as a winding wire thickness T (with the proviso that winding wire width W>winding wire thickness T), as a range across which the winding wires of coils, which are next to each other, overlap, a range that is in a range of T (winding wire thickness) to W (winding wire width), and close to W (winding wire width) is preferable.

The plurality of magnetic connection members F100a and F100b are disposed in a manner which magnetically connects coils among the plurality of coils L100a to L100g, which are adjacent with one or more coils therebetween, and does not magnetically connect coils among the plurality of coils L100a to L100g, which are next to each other. Additionally, detailed description of the magnetic connection members F100a and F100b has been omitted since the configuration thereof is the same as the plurality of magnetic connection members F1a and F1b that the coil for wireless power transmission L1 according to the first embodiment is provided with, but each of the plurality of magnetic connection members F100a and F100b includes a plurality of facing parts that face coils that configure the plurality of coils L100a to L100g, and the plurality of facing parts include one or more first portion (not shown in the drawings), and a plurality of second portions (not shown in the drawings) that are positioned with at least one first portion therebetween, and a distance between the second portions and coils that face the second portions is shorter than a distance between the first portions and coils that face the first portions. In the present embodiment, the magnetic connection member F100a is connected to the core C100a of the coil L100a and the core C100c of the coil L100c, which are adjacent with the coil L100b therebetween, is connected to the core C100c of the coil L100c and the core C100e of the coil L100e, which are adjacent with the coil L100d therebetween, and is connected to the core C100e of the coil L100e and the core C100g of the coil L100g, which are adjacent with the coil L100f therebetween, and the magnetic connection member F100b is connected to the core C100b of the coil L100b and the core C100d of the coil L100d, which are adjacent with the coil L100c therebetween, and is connected to the core C100d of the coil L100d and the core C100f of the coil L100f, which are adjacent with the coil L100e therebetween. That is, the core C100a of the coil L100a, the core C100c of the coil L100c, the core C100e of the coil L100e and the core C100g of the coil L100g are magnetically connected by the magnetic connection member F100a, and the core C100b of the coil L100b, the core C100d of the coil L100d and the core C100f of the coil L100f are magnetically connected by the magnetic connection member F100b. Additionally, the magnetic connection member F100a and the magnetic connection member F100b are disposed in a manner in which the magnetic connection member F100a and the magnetic connection member F100b do not contact with one another. As a material of the plurality of magnetic connection members F100a and F100b, a magnetic material such as ferrite in which a magnetic permeability is high in comparison with the surrounding air is preferable.

Next, a power feeding operation that corresponds to an facing state (a relative positional relationship) of the plurality of coils L100a to L100g and the receiving coil L2 will be described with reference to FIG. 12. FIG. 12 is a cross-sectional view that illustrates an facing state (a relative positional relationship) of a plurality of coils and a receiving coil for describing a power feeding operation.

FIG. 12 illustrates a state in which the coils coil L100c, coil L100d, coil L100e and 1100f and the receiving coil L2 are faced. More specifically, FIG. 12 illustrates a state in which an overlapping portions of the winding wire W100c of the coil L100c and the winding wire W100d of the coil L100d face the magnetic pole part P2a of the receiving coil L2, an overlapping portions of the winding wire W100e of the coil L100e and the winding wire W100f of the coil L100f face the magnetic pole part P2b of the receiving coil L2, an overlapping portions of the winding wire W100e of the coil L100e and the winding wire W100f of the coil L100f face the magnetic pole part P2b of the receiving coil L2, a distance to the magnetic pole part P2a to the center of the coil L100c and a distance to the magnetic pole part P2a to the center of the coil L100d is substantially equal, and a distance to the magnetic pole part P2b to the center of the coil L100e and a distance to the magnetic pole part P2b to the center of the coil L100f is substantially equal. At this time, among the plurality of coils L100a to L100g, the coil L100c or the coil L100d for which a distance to the magnetic pole part P2a of the receiving coil L2 is shortest, is selected by the synchronization switch SW and is electrically connected to the inverter INV. In addition, in the same manner, among the plurality of coils L100a to L100g, the coil L100e or the coil L100f for which a distance to the magnetic pole part P2b of the receiving coil L2 is shortest, is selected by the synchronization switch SW and is electrically connected to the inverter INV. However, in a case in which the coil L100c is selected by the synchronization switch SW, the coil L100e, which is magnetically connected to the coil L100c by the magnetic connection member F100a, is simultaneously selected, and in a case in which the coil 100d is selected by the synchronization switch SW, the coil L100f, which is magnetically connected to the coil L100d by the magnetic connection member F100b, is simultaneously selected.

In a case in which the coil L100c and the coil L100e are selected by the synchronization switch SW and electrically connected to the inverter INV, input DC power that is supplied from the power source PW is converted into AC power that is suitable for wireless power transmission by the inverter INV, and the AC power is supplied to the coils L100c and L100e via the synchronization switch SW. Since, the coil L100c and the coil L100e are magnetically connected to each other by the magnetic connection members F100a, and directions of magnetic fields that are generated when a current flows through the coils L100c and L100e are mutually inverse directions, a loop of a magnetic flux B100a, which interlinks both the coil L100c and the coil L100e, is formed. Since the magnetic flux B100a also interlinks the receiving coil L2, an electromotive force that corresponds to the magnetic flux B100a is produced in the winding wires W2 of the receiving coil L2. Further, the power that is produced in the receiving coil L2 is rectified by the rectifying circuit DB and output to the load R. In this instance, since the coil L100c and the coil L100e are magnetically connected by the magnetic connection member F100a, the formation of a loop of a magnetic flux of the coils L100b, L100d and L100f which are adjacent, and are not magnetically connected is suppressed, and therefore, a loop of the magnetic flux B100a is formed easily in the coil L100c and the coil L100e. As a result of this, it is possible to suppress deterioration in coupling even in a case in which a distance between coils, where power transmission is performed, is large. Furthermore, in the coil L100c and the coil L100e, the respective distances to the magnetic pole parts P2a and P2b of the receiving coil L2 are the shortest, and since it is possible to form a magnetic path of a loop of the magnetic flux B100a that is formed in the coil L100c and the coil L100e with the shortest path, it is possible to suppress deterioration of the magnetic flux B100a that interlinks the receiving coil L2.

On the other hand, in a case in which the coil L100d and the coil L100f are selected by the synchronization switch SW and electrically connected to the inverter INV, input DC power that is supplied from the power source PW is converted into AC power that is suitable for wireless power transmission by the inverter INV, and the AC power is supplied to the coils L100d and L100f via the synchronization switch SW. Since, the coil L100d and the coil L100f are magnetically connected to each other by the magnetic connection members F100b, and directions of magnetic fields that are generated when a current flows through the coils L100d and L100f are mutually inverse directions, a loop of a magnetic flux B100b, which interlinks both the coil L100d and the coil L100f, is formed. Since the magnetic flux B100b also interlinks the receiving coil L2, an electromotive force that corresponds to the magnetic flux B100b is produced in the winding wires W2 of the receiving coil L2. Further, the power that is produced in the receiving coil L2 is rectified by the rectifying circuit DB and output to the load R. In this instance, since the coil L100d and the coil L100f are magnetically connected by the magnetic connection member F100b, the formation of a loop of a magnetic flux of the coils L100c, L100e and L100g which are adjacent, and are not magnetically connected is suppressed, and therefore, a loop of the magnetic flux B100b is formed easily in the coil L100d and the coil L100f. As a result of this, it is possible to suppress deterioration in coupling even in a case in which a distance between coils, where power transmission is performed, is large. Furthermore, in the coil L100d and the coil L100f, the respective distances to the magnetic pole parts P2a and P2b of the receiving coil L2 are the shortest, and since it is possible to form a magnetic path of a loop of the magnetic flux B100b that is formed in the coil L100d and the coil L100f with the shortest path, it is possible to suppress deterioration of the magnetic flux B100b that interlinks the receiving coil L2.

In the abovementioned manner, in the wireless power transmission apparatus S100 according to the present embodiment, winding wires of coils among the plurality of coils L100a to L100g, which are next to each other, are disposed so that at least a part thereof overlap. Therefore, a disposition interval between the plurality of coils L100a to L100g is reduced, and therefore, it is possible to generate a magnetic flux B100a and B100b that contributes to power transmission in a compact manner. Accordingly, it is possible to further suppress deterioration in coupling between coils where power transmission is performed even in a case in which positional shift occurs between coils where power transmission is performed.

The present invention has been described above on the basis of embodiments. The embodiments are examples, and the facts that various modifications and alterations are possible within the range of the claims of the present invention, and that such modification examples and alterations are also included within the range of the claims of the present invention, will be understood by persons skilled in the art. Therefore, the statements and drawings in the present description are not limiting and should be interpreted as illustrative examples.

What is claimed is:

1. A coil for wireless power transmission that transmits or receives power wirelessly, comprising:
a plurality of coils; and
a plurality of magnetic connection members comprising at least a first magnetic connection member and a second magnetic connection member;
wherein:
the plurality of magnetic connection members are positioned such that the first magnetic connection member magnetically connects a first coil and a second coil of the plurality of coils such that there is at least one coil of the plurality of coils provided between the first coil and the second coil, the first magnetic connection member does not magnetically connect adjacent coils, and
a first direction of a first magnetic field when a current flows through the first coil is opposite a second direction of a second magnetic field when a current flows through the second coil.

2. A coil for wireless power transmission that transmits or receives power wirelessly, comprising:
a plurality of coils; and
a plurality of magnetic connection members that are disposed in a manner in which the magnetic connection members do not contact with one another,
wherein:
each of the plurality of magnetic connection members includes a plurality of facing parts that face coils that configure the plurality of coils,
the plurality of facing parts include:
one or more first portions, and
a plurality of second portions that are positioned with at least one first portion therebetween,
a distance between one of the second portions and a corresponding coil that faces the one of the second portions is shorter than a distance between one of the first portions and a corresponding coil that faces the one of the first portions, and
in at least two coils that face the second portions, directions of magnetic fields that are generated when a current flows through the coils are mutually inverse directions.

3. The coil for wireless power transmission according to claim 1,
wherein the plurality of coils are disposed so that at least a part of winding wires of adjacent coils overlap each other.

4. A wireless power transmission apparatus which wirelessly transmits power, comprising:
the coil for wireless power transmission according to claim 1; and
a helical-shaped coil in which winding wires are wound around a rod-shaped or a plate-shaped magnetic path core,
wherein the magnetic path core includes magnetic pole parts at both ends thereof, and
a distance between the magnetic pole parts is substantially equal to a distance between the centers of coils that are magnetically connected.

5. The coil for wireless power transmission according to claim 2,
wherein the plurality of coils are disposed so that at least a part of winding wires of adjacent coils overlap each other.

6. A wireless power transmission apparatus which wirelessly transmits power, comprising:
the coil for wireless power transmission according to claim 2; and
a helical-shaped coil in which winding wires are wound around a rod-shaped or a plate-shaped magnetic path core,
wherein the magnetic path core includes magnetic pole parts at both ends thereof, and
a distance between the magnetic pole parts is substantially equal to a distance between the centers of coils that face the second portions.

7. A wireless power transmission apparatus which wirelessly transmits power, comprising:

the coil for wireless power transmission according to claim 3; and a helical-shaped coil in which winding wires are wound around a rod-shaped or a plate-shaped magnetic path core, wherein the magnetic path core includes magnetic pole parts at both ends thereof, and a distance between the magnetic pole parts is substantially equal to a distance between the centers of coils that are magnetically connected.

8. A wireless power transmission apparatus which wirelessly transmits power, comprising:

the coil for wireless power transmission according to claim 5; and a helical-shaped coil in which winding wires are wound around a rod-shaped or a plate-shaped magnetic path core, wherein the magnetic path core includes magnetic pole parts at both ends thereof, and a distance between the magnetic pole parts is substantially equal to a distance between the centers of coils that face the second portions connected.

\* \* \* \* \*